United States Patent [19]
Suzuki et al.

[11] Patent Number: 5,751,359
[45] Date of Patent: May 12, 1998

[54] METHOD FOR QUANTIZING COMPRESSED VIDEO SIGNALS

[75] Inventors: Teruhiko Suzuki, Chiba; Yoichi Yagasaki, Kanagawa, both of Japan

[73] Assignee: Sony Corporation, Tokyo, Japan

[21] Appl. No.: 615,422

[22] Filed: Mar. 14, 1996

[30] Foreign Application Priority Data

Mar. 17, 1995 [JP] Japan .................... 7-058944

[51] Int. Cl.⁶ ................................. H04N 07/30
[52] U.S. Cl. .................. 348/405; 348/400; 348/401; 348/404; 348/419; 375/244; 375/245
[58] Field of Search ................. 348/397, 400–407, 348/411, 419, 421, 699, 700; 375/244, 245

[56] References Cited

U.S. PATENT DOCUMENTS

| | | | |
|---|---|---|---|
| 4,386,237 | 5/1983 | Virupaksha et al. | 395/2.33 |
| 4,677,479 | 6/1987 | Hatori et al. | 348/421 |
| 5,028,999 | 7/1991 | Vogel | 348/419 |
| 5,072,295 | 12/1991 | Murakami et al. | 348/401 |
| 5,157,488 | 10/1992 | Pennebaker | 348/405 |
| 5,231,484 | 7/1993 | Gonzales et al. | 348/405 |
| 5,349,383 | 9/1994 | Parke et al. | 348/397 |
| 5,444,487 | 8/1995 | Kondo et al. | 348/405 |
| 5,481,309 | 1/1996 | Juri et al. | 348/405 |
| 5,500,677 | 3/1996 | Fert | 348/402 |
| 5,521,643 | 5/1996 | Yim | 348/419 |
| 5,543,843 | 8/1996 | Kato et al. | 348/400 |

*Primary Examiner*—Tommy P. Chin
*Assistant Examiner*—Frank Snow
*Attorney, Agent, or Firm*—Frommer Lawrence & Haug LLP; William S. Frommer

[57] ABSTRACT

A method for encoding a 10-bit based picture using a circuitry or devices inherently designed for handing an 8-bit based picture. The 10-bit based input picture data is motion-compensated with 8 bits in a motion compensation circuit. From the motion-compensated picture data, representative value data and the quantization width are found by an in-bloc representative value calculation circuit and a block quantization width calculation circuit, respectively. A difference between the picture data and the representative value data is found by an adder. The difference is sent to a block quantizer where first 8-bit quantized data is generated on the basis of the quantization width so that the representative value is at a mid point of the quantization width. The first quantized data is transformed by a discrete cosine transform circuit of a difference signal encoder to generate transform coefficients which are quantized by a quantizer to generate second quantized data. A variable length encoding circuit encodes the representative value data, quantization width and the second quantized data. The 10-bit based picture can be encoded by the circuitry or the devices designed for an 8-bit based picture without substantially deteriorating the picture quality.

10 Claims, 21 Drawing Sheets

```
sequence_header() {
    sequence_header-code              32      bslbf
    horizontal_size_vale              12      uimsbf
    vertical_size_vale                12      uimsbf
    aspect_ratio_information          4       uimsbf
    frame_rate_code                   4       uimsbf
    bit_rate_value                    18      uimsbf
    marker_bit                        1       bslbf
    vbv_buffer_size_vale              10      uimsbf
    constrained_parameters_flag       1
    load_intra_quantiser_matrix       1
    if(load_intra_quantiser_matrix)
        intra_quantiser_matrix [64]   8 * 64  uimsbf
    load_non_intra_quantiser_matrix   1
    if(load_non_quantiser_matrix)
        non_intra_quantiser_matrix [64]  8 * 64  uimsbf
    next_start_code()
}
```

FIG.11

```
extension_and_user_data(i){
    while((next_bits()= =extension_start_code) ||
                (next_bits_()= =user_data_start_code)){
        if(i! =1)
            if(next_bits()= =extension_start_code)
                extension_data(i)
        if(next_bits()= =user_data_start_code)
            user_data()
    }
} extension_data(i){
    while(next_bits()= =extension_start_code){
        extension_start_code                              32      bslbf
        if(i = = 0){/* sequence_extension */
            if(next_bits() = = "Sequence Display Extension ID")
                sequence_display_extension()
            if(next_bits() = = "Sequence Scalable Extension ID")
                sequence_scalable_extension()
        }
        if(i = = 2){
            if(next_bits() = = "Quant Matrix Extension ID")
                quant_matrix_extension()
            if(next_bits() = = " Picture Pan Scan Extension ID")
                picture_display_extension()
            if(next_bits() = = "Picture Spatial Scalable Extension ID")
                picture_spatical_ scalable_extension()
            if(next_bits() = = "Picture Temporal Scalable Ext, ID")
                picture_temporal_extension()
        }
    }
}
```

FIG.12

```
sequence_extension() {
    extension_start_code              32    bslbf
    extension_start_code_identifier    4    uimsbf
    profile_and_level_indication       8    uimsbf
    progressive_sequence               1    uimsbf
    chroma_format                      2    uimsbf
    horizontal_size_extension          2    uimsbf
    vertical_size_extension            2    uimsbf
    bit_rate_extension                12    uimsbf
    marker_bit                         1    bslbf
    vbv_buffer_size_extension          8    uimsbf
    low_delay                          1    uimsbf
    frame_rate_extension_n             2    uimsbf
    frame_rate_extension_d             5    uimsbf  ⎫
    extension_bit_input                1    uimsbf  ⎬ L1
    next_start_code()
}
```

FIG.13

```
macroblock() {
    while(next_bits() = = '0000 0001 000')
        macroblock_escape              11    bslbf
    macroblock_address_increment       1-11  vlclbf
    macroblock_modes()
    if(macroblock_quant)
        quantiser_scale_code           5     uimsbf
    if(macroblock_motion_forward | |
        (macroblock_intra_ & & concealment_motion
            _vectors))
            motion_vectors(0)
    if(macroblock_motion_backward)
        motion_vectors(1)
    if(macroblock_intra_ & & concealment_motion
        _vectors)
            marker_bit                 1     bslbf
    if(macroblock_pattern)
        coded_block_pattern()
    if(extension_bit_input){
        block base                     A*m   uimsbf  ⎫
        block_a_scale                  B*m   uimsbf  ⎬ L2
    }                                                ⎭
    for(i=0 ; i<block_count; i++){
        block(i)
    }
}
```

FIG.14

```
macroblock() {
    while(next_bits() = = '0000 0001 000')
        macroblock_escape                    11      bslbf
        macroblock_address_increment         1-11    vlclbf
        macroblock_modes()
        if(macroblock_quant)
            quantiser_scale_code             5       uimsbf
        if(macroblock_motion_forward | |
           (macroblock_intra & & concealment_motion
             _vectors))
            motion_vectors(0)
        if(macroblock_motion_backward)
            motion_vectors(1)
        if(macroblock_intra & & concealment_motion
          _vectors)
            marker_bit                       1       bslbf
        if(macroblock_pattern)
            coded_block_pattern()
        ntc_identifier                       1       uimsbf  ⎫
        if(!ntc_identifier & & extension_bit_input){         ⎬ L2
            block_base                       A*m     uimsbf  ⎪
            block_a_scale                    B*m     uimsbf  ⎭
        }
        for(i=0 ; i<block_count; i++){
            block(i)
        }
}
```

FIG.19

METHOD FOR QUANTIZING COMPRESSED VIDEO SIGNALS

BACKGROUND OF THE INVENTION

1. Field of the invention

This invention relates to a method for encoding picture signals and, more particularly, to a method for encoding picture signals which may be conveniently employed for recording/reproducing picture signals on or from a recording medium, such as a magneto-optical disc or a magnetic tape. The invention also relates to the recording medium for recording the picture signals.

2. Description of the Related Art

As a technique for encoding moving picture signals by exploiting the inter-frame or inter-field correlation of picture signals, there is currently known the MPEG system.

With the MPEG system, picture signals are processed with, for example, discrete cosine transform (DCT) for concentrating the signal power in a particular frequency component for data compression.

Also, inter-frame or inter-field correlation is exploited for encoding picture signals for further data compression.

With the MPEG system, original frame pictures are processed into I-pictures, P-pictures or b-pictures by way of achieving compression of picture signals by encoding.

As for picture signals of the I-pictures, picture signals per se of the corresponding frame or fields are transmitted. As for picture signals of the P-pictures, basically, the differences from picture signals of temporally preceding I-pictures or P-pictures are transmitted. On the other hand, as for picture signals of the B-pictures, basically the differences from mean values of picture signals of the temporally previous frames and the temporally succeeding frames are found and encoded. Specifically, the processing as the B-pictures may be classified into the following four types.

The first processing type is to transmit data of an original frame F2 directly as transmitted data. Thus the first processing type is similar to that of an I-picture. For demarcation from the intra-coding or I-picture, the present processing type is referred to herein as intra-picture predictive coding.

The second processing type is to calculate the difference from a temporally posterior frame F3 and to transmit the resulting difference (backward predictive coding).

The third processing type is to transmit the difference from a temporally previous frame F1 (forward predictive coding).

The fourth processing type is to generate the difference from the mean values of the temporally previous frame F1 and the temporally posterior frame F3 and to transmit the difference as transmitted data.

Of these processing types, one which minimizes the volume of transmitted data is employed.

Since the second to fourth processing types perform predictive coding between at least two pictures, they are collectively termed the inter-picture predictive coding.

The hybrid picture encoding system, consisting in the combination of the DCT processing and motion prediction, is employed not only in the above-mentioned MPEG system but also in CCITT H261 which is the encoding standard for moving pictures employed in television telephone.

FIG. 1 shows, in a block diagram, the structure of an embodiment of a conventional picture signal encoding apparatus for encoding moving picture signals based upon the above-described principle. First, 8-bit based picture data, divided into, for example, 8×8 pixels or 16×16 pixels, are supplied on the block basis to a field memory group 115 for storage therein.

A motion prediction circuit 2 then processes picture data of respective frames or fields stored in the field memory group 115 as I-pictures, P-pictures or as B-pictures, in accordance with a pre-set sequence. It is pre-determined by which of the I-, P- or B-pictures the frame-based or field-based picture data sequentially entered and stored in the field memory group 115 are to be processed. For example, the group-of-pictures constituted by the frames F1 to F17 is processed as I, B, P, B, P, . . . B, P.

The signals of the respective pictures, stored in the field memory group 115, are read out therefrom so as to be processed by an adder 3 for intra-picture prediction, forward prediction, backward prediction or bi-directional prediction. Which of these operations is to be performed is determined depending upon a prediction error signal (difference between a reference picture, that is a picture being processed, and a prediction picture therefor). Thus the motion prediction circuit 2 generates the sum of absolute values or square sums of prediction error signals used for this decision in the following manner.

That is, as the sum of absolute values of prediction errors for intra-picture prediction, the difference between an absolute value of the sum $\Sigma Aij$ of block signals $Aij$ of the reference picture and the sum $\Sigma |Aij|$ of absolute values $|Aij|$ of block signals $Aij$ is found. In addition, as the sum of absolute values of prediction errors for forward prediction, a sum $\Sigma |Aij-Bij|$ of absolute values $|Aij-Bij|$ of the difference $Aij-Bij$ between the block signals $Aij$ of the reference picture and block signals $Bij$ of the prediction picture is found. The sum of absolute values of prediction errors for backward prediction and bi-directional prediction is found in a similar manner to that for forward prediction provided that the prediction pictures are changed to those different for the forward prediction. The motion prediction circuit 2 selects the sums of absolute values of prediction errors for forward prediction, for backward prediction or for bi-directional prediction, whichever is the least, as the sum of absolute values of the prediction errors of inter-picture prediction. The motion prediction circuit 2 also compares the sum of absolute values of the prediction errors of inter-picture prediction to the sum of absolute values of the prediction errors of intra-picture prediction and selects the smaller one, while selecting the mode associated with the selected sum of absolute values as a motion compensation mode. That is, if the sum of absolute values of the prediction errors of intra-picture prediction is smaller, the intra-prediction mode is set. If the sum of absolute values of the prediction errors of inter-picture prediction is smaller, the motion compensation mode associated with the smallest one of the sums of absolute values for forward prediction, backward prediction or the bi-directional prediction is set.

In addition, the motion prediction circuit 2 detects the motion vector between the prediction picture and the reference picture associated with the motion compensation mode thus set and outputs the detected motion vector to a variable length coding (VLC) circuit 117 and to a motion compensation circuit 14. The motion vector which will give the smallest value of the sum of absolute values of associated prediction errors is selected.

If picture data of an I-picture is read out from the field picture group 115, the motion prediction circuit 2 sets the intra-picture prediction mode, that is the mode which does not perform motion compensation, is selected as the motion compensation mode. This inputs picture data of the I-picture to a differential signal encoder 8 without being processed by the adder 3.

The differential signal encoder 8 is made up of a DCT circuit 111 and a quantizer 112. The DCT circuit 111 processes picture data of the I-picture, supplied from the field memory group 115 without being processed by the adder 3, with DCT, for converting the data into DCT coefficients, which then enter the quantizer 112. The DCT coefficients are then quantized with a quantization width S associated with a stored data quantity in a transmission buffer, not shown, provided downstream of the VLC circuit 117, and thence supplied to the VLC circuit 117.

The VLC circuit 117 converts picture data supplied from the quantizer 112, herein data of the i-picture, into variable length codes, such as Huffman codes, which are outputted to the downstream side transmission buffer.

If the residual data quantity in the transmission buffer, provided downstream of the VLC circuit 117, is increased to an allowable upper limit value, the transmission buffer diminishes the data quantity of the quantized data by increasing the quantization width S of the quantizer 112 by a corresponding quantization control signal. Conversely, if the residual data quantity is decreased to the allowable lower limit value, the transmission buffer increases the data quantity of the quantized data by decreasing the quantization width S of the quantizer 112 by a corresponding quantization control signal. This prohibits the overflow or underflow in the transmission buffer from occurring.

The VLC circuit 117 is also supplied from the quantizer 112 with the quantization width S, for variable length coding, while being supplied from the motion prediction circuit 2 with the motion compensation mode, that is the mode specifying the intra-picture prediction, forward prediction, backward prediction or bi-directional prediction, as set, and with the motion vector, for variable length coding.

Output data of the VLC circuit 117 are stored temporarily in the downstream side transmission buffer from which it is read out at a pre-set timing so as to be outputted on a transmission channel for e.g., recording on a recording medium.

On the other hand, I-picture data outputted by the quantizer 112 are also supplied to a differential signal decoder 9. The differential signal decoder 9 is made up of a dequantizer 113 and an inverse DCT circuit 114. The dequantizer 113 de-quantizes the I-picture data outputted by the quantizer 112 with the same quantization width as the quantization width S in the quantizer 112. An output of the dequantizer 113 is supplied to the inverse DCT circuit 114 where it is inverse DCTed and thence supplied via an adder 12 to a field memory group 116 for storage therein.

When processing sequentially entered picture data of respective frames as, for example, I, B, P, B, P, B, . . . , the motion prediction circuit 2 processes the first entered frame picture as an I-picture. Before processing the picture of the next entered frame, the motion prediction circuit 2 processes picture data of the further next frame as a P-picture. The reason is that, since the B-picture is processed with backward prediction, decoding cannot be done unless the P-picture as the backward prediction picture is not provided previously.

Thus the motion prediction circuit 2 starts processing picture data of the P-picture, stored in the field memory group 115, next to the processing of the I-picture. The motion compensation mode for intra-picture prediction or forward prediction is then set in association with the sum of absolute values of the block-based inter-frame difference (prediction errors), as explained previously.

If the intra-picture prediction mode is set, the adder 3 outputs data from the field memory group 115 without any processing. Thus, similarly to the I-picture data, the data is transmitted over the transmission channel via the differential signal encoder 8, VLC circuit 117 and the transmission buffer. In addition, the data is supplied via the differential signal decoder 9 and the adder 12 to the field memory group 116 for storage therein.

For the forward prediction mode, data of the picture stored in the field memory group 116, herein the I-picture, are read out so as to be motion-compensated by the motion compensation circuit 14 in association with the motion vector outputted by the motion prediction circuit 2. That is, if the setting for the forward prediction mode is commanded by the motion prediction circuit 2, the motion compensation circuit 14 shifts the read-out address of the field memory group 116 in an amount corresponding to the motion picture from the position of the block being outputted by the motion prediction circuit 2 in order to read out data for generating data of the prediction picture.

The data of the prediction picture generated by the motion compensation circuit 14 is provided via the field memory group 116 to the adder 3. In this case, the adder 3 subtracts prediction picture data from the motion compensation circuit 14 corresponding to the block and outputs the difference, that is the prediction error. These difference data is transmitted over the transmission channel via the differential signal encoder 8, VLC circuit 117 and the transmission buffer. The difference data is also locally decoded by the difference signal decoder 9 so as to enter an adder 12.

The adder 12 is supplied with the same data as the prediction picture data supplied to the adder 3. The adder 12 adds prediction picture data outputted by the motion compensation circuit 14 to the difference data outputted by the difference signal decoder 9. This produces the original decoded picture data of the P-picture. The picture data of the P-picture is supplied to the field memory group 116 for storage therein.

The motion prediction circuit 2 executes processing of the B-picture after storage of the data of the I- and P-pictures in the field memory group 116. That is, the motion compensation mode is set to one of the intra-picture prediction mode, forward prediction mode, backward prediction mode or to the bi-directional prediction mode, in association with the magnitude of the sum of absolute values of the block-based inter-frame differences.

If the prediction mode is the intra-picture prediction mode or the forward prediction mode, the processing similar to that for the P-picture is performed for data transmission.

Conversely, for the backward prediction mode, the picture data stored in the field memory group 116, herein the picture data of the P-picture, is read out, so as to be motion-compensated by the motion compensation circuit 14 depending upon the motion vector outputted by the motion prediction circuit 2. That is, when the setting of the backward prediction mode is commanded by the motion prediction circuit 2, the motion prediction circuit 14 reads out data, as it shifts the read-out address of the field memory group 116 from the position registering with the position of the block being outputted by the motion prediction circuit 2 in an amount corresponding to the motion vector, for generating prediction picture data.

The prediction picture data generated by the motion compensation circuit 14 is supplied via the field memory group 116 to the adder 3. The adder 3 subtracts the prediction picture data supplied from the motion compensation circuit 14 from the data of the block of the reference picture supplied from the field memory group 115 to output resulting difference data. The difference data is transmitted over the transmission channel via the difference signal encoder 8, VLC circuit 117 and the transmission buffer.

For the bi-directional prediction mode, the picture data stored in the field memory group 116, herein the picture data of the I-picture, and picture data of a picture, herein a P-picture, are read out, so as to be motion-compensated by the motion compensation circuit 14 depending upon the motion vector outputted by the motion prediction circuit 2. That is, when the setting of the bi-directional prediction mode is commanded by the motion prediction circuit 2, the motion prediction circuit 14 reads out data, as it shifts the read-out address of the field memory group 116 from the position registering with the position of the block being outputted by the motion prediction circuit 2 in an amount corresponding to two motion vectors, that is the motion vector for froward prediction picture and that for the backward prediction picture, for generating prediction picture data.

The prediction picture data generated by the motion compensation circuit 14 is supplied via the field memory group 116 to the adder 3. The adder 3 subtracts a mean value of prediction picture data supplied from the motion compensation circuit 14 from data of the block of the reference picture supplied from the motion prediction circuit 2 and outputs resulting difference data. The difference data is transmitted over the transmission channel via the difference signal encoder 8, VLC circuit 117 and the transmission buffer.

Since the picture data of the B-picture is not used as a prediction picture for other pictures, it is not stored in the field memory group 116.

In the above processing, the picture data read-out timing from the field memory groups 115 and 116 is controlled on the basis of timing control signals generated in a memory controller 16 in association with synchronization signals of the input picture.

FIG. 2 shows, in a block diagram, the structure of an example of a picture signal decoding apparatus for decoding a picture encoded by the picture signal encoding apparatus shown in FIG. 1. The encoded picture data is received over a transmission channel by a reception circuit, not shown, or reproduced by a reproducing apparatus from a recording medium so as to be supplied to a variable length decoding (VLD) circuit 124. The VLD circuit 124 variable length decodes encoded picture data and outputs the motion vector and the motion compensation mode to a motion compensation circuit 27 while outputting the quantization width S and decoded picture data, that is variable length decoded picture data, to a difference signal decoder 22.

Similarly to the difference signal decoder 9 of FIG. 1, the difference signal decoder 22 is made up of a dequantizer 121 and an inverse DCT circuit 122. The dequantizer 121 dequantizes picture data supplied from the VLD circuit 124 in accordance with the quantization width S supplied from the VLD circuit 124 and outputs the resulting dequantized data to the inverse DCT circuit 122. Output data of the dequantizer 121, that is DCT coefficients, are inverse DCT by the inverse DCT circuit 122 and thence supplied to an adder 25.

If picture data supplied from the inverse DCT circuit 122 is I-picture data, the data is directly outputted at the adder 25 and thence supplied to and stored in a field memory group 123 for generating prediction picture data for picture data subsequently supplied to the adder 25, that is data of the P- or B-picture. The picture data is also outputted as decoded picture data via the field memory group 123.

If picture data supplied from the inverse DCT circuit 122 is picture data of a P-picture having picture data of a directly previous frame as prediction picture data, and is data of the forward prediction mode, the picture data of the directly previous frame, that is data of an I-picture, stored in the field memory group 123, is read out, and motion-compensated in the motion compensation circuit 27 depending upon the motion vector outputted by the motion compensation circuit 27 from the VLD circuit 124. The resulting data is added in the adder 25 to picture data supplied from the inverse DCT circuit 122, that is difference data. The resulting sum data, that is data of a decoded P-picture, is supplied to and stored in the field memory group 123 for generating data of a prediction picture for picture data subsequently entering the adder 25, that is data of a B- or P-picture.

The picture data of a P-picture and of the intra-picture prediction mode is not processed by the adder, as is I-picture data, but is directly stored in the field memory group 123.

Since the P-picture is displayed next to the next following B-picture, it is not outputted as yet at this time from the field memory group 123. The P-picture entered subsequently to the B-picture is processed and transmitted temporally before the B-picture, as explained previously.

If picture data supplied from the inverse DCT circuit 122 is picture data of a B-picture, picture data is read out depending upon the motion compensation mode supplied from the VLD circuit 124. That is, picture data of an I-picture, a P-picture or both the I- and P-pictures, stored in the field memory group 123, are read out from the field memory group 123, for the forward prediction mode, backward prediction mode or the bi-directional prediction mode, respectively, so as to be motion-compensated in the motion compensation circuit 27 depending upon the motion vector outputted by the VLD circuit 124 for generating a prediction picture. However, no prediction picture is generated in case motion compensation is not required, that is for the intra-picture prediction mode.

The data motion-compensated by the motion compensation circuit 27 is added at the adder 25 to an output of the inverse DCT circuit 122. The resulting addition output is directly outputted via the field memory group 123.

The addition output is the B-picture data and is not used for generating a prediction picture for other pictures, so that it is not stored in the field memory group 123.

After outputting the B-picture, pictured data of the B-picture stored in the field memory group 123 are read out and outputted.

Output data from the field memory group 123 are converted from a block format into a frame format and D/A converted by a D/A converter so as to be outputted to and displayed in a display, such as a CRT display.

If the picture is a color picture, the above processing is carried out for both luminance signals and color signals, for example, chroma signals. However, in such case, the motion vector for the luminance signals, halved in both the vertical and horizontal directions, is occasionally employed for chroma signals.

In the above processing, a timing pulse is outputted to a memory controller 28 at a timing the VLD circuit 124 variable length decodes a picture and the memory controller 28 outputs a timing control signal to the field memory group 123 in timed relation to the timing pulse. This controls the read-out timing of reading out picture data from the field memory group 123.

The MPEG system devices are designed, manufactured and marketed on the premises that 8-bit based digital picture signals are entered to and outputted from the devices.

For example, a quantizer 112 of the difference signal encoder 8 is designed, manufactured and marketed such that picture data represented by 8 bits for 0 to 255 and picture data represented by 8 bits plus a sign bit or 9 bits can be quantized for the intra-picture prediction mode and for the inter-picture prediction mode, respectively.

However, with recent progress in the digital signal processing technique, a demand is raised for picture signals of higher precision than 8-bit based picture signals. For example, for tele-cine conversion of a motion picture film into high definition TV (HDTV) signals, or in a CT used for medical diagnosis, picture signals of higher precision, such as 10-bit-based picture signals, are preferred to the usual 8-bit-based picture signals.

However, since the hardware constituting a block operating as a heart of the existing picture signal encoding apparatus or decoding apparatus is designed on the premises that 8-bit-based picture signals are entered to or outputted from the apparatus, it has been difficult with the existing apparatus to encode or decode picture signals based upon more than 8 bits. On the other hand, high picture quality is required of picture signals of word lengths exceeding 8 bits.

SUMMARY OF THE INVENTION

It is therefore an object of the present invention to enable high precision picture signals to be encoded and decoded using an existing hardware.

It is another object of the present invention to provide a method and apparatus for encoding picture signals, a picture signal recording medium and a picture signal decoding apparatus whereby m-bit based picture signal, for example, 10-bit based picture signals, may be processed as n-bit based picture signals, for example, 8-bit based picture signals, as the quantization error is decreased.

According to the present invention, there is provided a picture signal encoding method for converting m-bit picture data into n-bit data, where m and n are integers, with m>n. The picture signal encoding method includes the steps of determining representative value data and the quantization step of picture data for each pre-set block of m-bit input picture data, calculating m-bit difference data between the picture data and the representative value data, quantizing the m-bit difference data on the basis of the quantization width to n bits, where m and n are integers, with m>n, for generating first quantized data by a first quantization operation, transforming the first quantized data for generating transform coefficients, quantizing the transform coefficients for generating second quantized data by a second quantization operation, and encoding said representative value data, quantization width and the second quantized data. The first quantization operation is executed using rounding which will produce an error not larger than one step between the quantization width in the neighborhood of the 0 quantization level and that in other quantization levels, instead of using simple rounding, for minimizing the quantization error.

Specifically, the quantization for minimizing the quantization error means that quantization is to be performed at each quantization level with an error not larger than one quantization step of the original picture data.

For encoding an m-bit picture, such as a 10-bit picture, reversible encoding may be changed over to irreversible encoding or vice versa.

BRIEF DESCRIPTION OF THE DRAWINGS

FIG. 11 illustrates an example of a format of a sequence header in a bitstream outputted by a picture signal encoding apparatus embodying the present invention.

FIG. 12 illustrates an example of a format of extension data (extension__ data) added to a sequence header of a bitstream.

FIG. 13 illustrates an example of a format of a sequence extension (sequence__ extension) of a bitstream.

FIG. 14 illustrates an example of a format of a macroblock header in a bitstream outputted by a picture signal encoding apparatus embodying the present invention.

FIG. 19 illustrates a typical format of a macro-block header in a bitstream employed in a third embodiment of the present invention.

DESCRIPTION OF THE PREFERRED EMBODIMENTS

Figure 1:
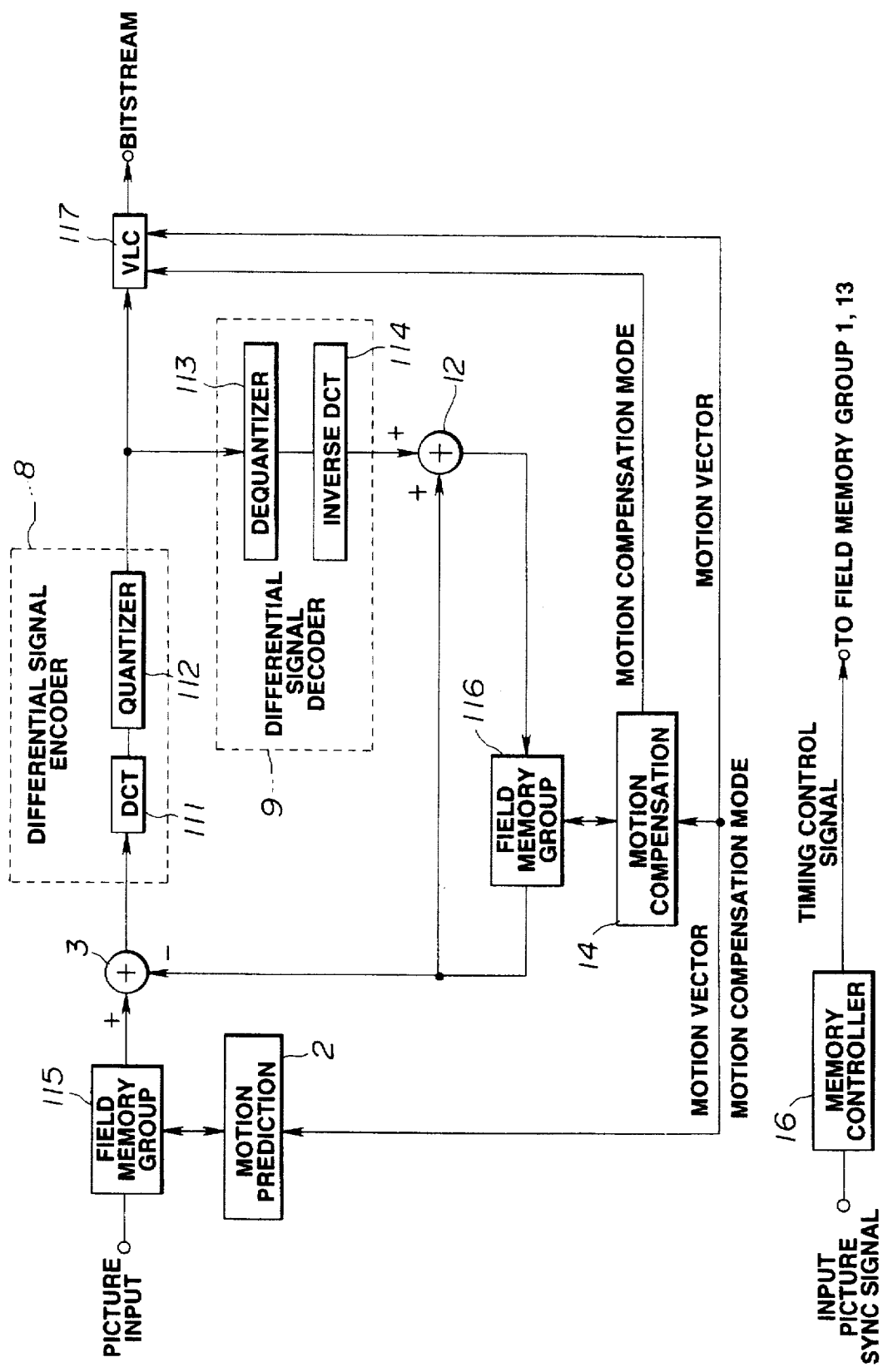
FIG. 1 is a schematic block diagram showing a structure of a picture signal encoding apparatus.

Referring to the drawings, certain preferred embodiments of a picture signal encoding apparatus and a picture signal decoding apparatus according to the present invention will be explained in detail.

Figure 3:
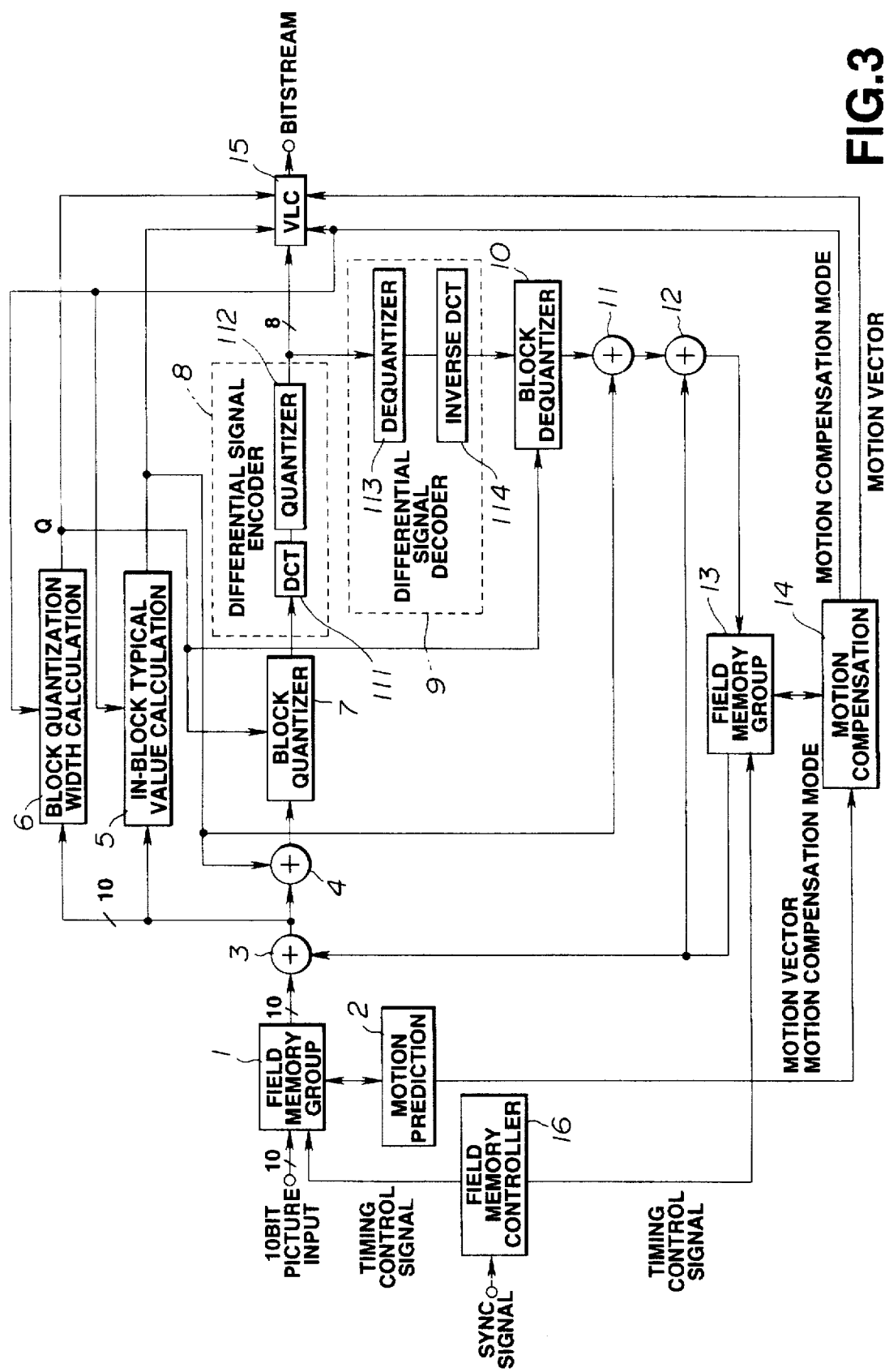
FIG. 3 is a schematic block diagram showing a structure of a picture signal encoding apparatus according to a first embodiment of the present invention.

FIG. 3 shows, in a block diagram, an arrangement of a first embodiment of a picture signal encoding apparatus according to the present invention.

The arrangement of FIG. 3 is similar to a circuit block disclosed in the drawings attached to the JP Patent Kokai Publication HEI-6-209469 filed by the present Assignee. The corresponding text in english, which is lacking in the Kokai Publication, would be submitted if such is allowable.

In the present first embodiment, it is assumed that picture data of higher precision than 8-bit based picture data, such as 10-bit based picture data, is entered to the apparatus. Of course, the present invention may generally be applied to a case in which m-bit based picture data, having a higher degree of precision than n-bit based picture data, is entered to the apparatus.

A field memory group 1 is configured for storing 10-bit based picture data. That is, the field memory group 1 transiently stores digital picture data (picture pixel data), divided into, for example, 16×16 pixel blocks, and outputs blocks of 10-bit based picture data to an adder 3, based upon a timing control signal generated by a field memory controller 16 in a timed relation to synchronization signals for input pictures.

As discussed in connection with FIG. 1, the motion prediction circuit 2 sets a motion compensation mode for a block of picture data as a reference picture stored in the field memory group 1, that is the intra-picture prediction mode or one of the forward prediction mode, backward prediction mode or the bi-directional prediction mode. Also the motion prediction circuit 2 detects the motion vector between the reference picture and the prediction picture associated with the motion compensation mode as set and outputs the detected motion vector to a motion compensation circuit 14 and to a VLC circuit 15. In addition, the motion prediction circuit 2 transmits the motion compensation mode not only to the motion compensation circuit 14 and to the VLC circuit 15 but also to an in-block representative value calculation circuit 5 and a quantization width calculation circuit 6 for calculating the quantization width of block quantization via the motion compensation circuit 14.

The motion prediction circuit 2 shown in FIG. 3 is configured for being supplied with 8-bit based picture data, so that all of connection lines from the field memory group 1 cannot be connected to the prediction circuit 2.

Of the connection lines associated with 10-bit based picture data from the field memory group 1, the connection lines excluding those for the 2 lower order bits are connected to the motion prediction circuit 2.

That is, 8-bit based picture data corresponding to 10-bit based picture data devoid of the 2 lower order bits are supplied to the motion prediction circuit 2.

If a 10-bit based picture data block, as a reference picture, stored in the field memory group 1, is read out therefrom so as to be supplied to the adder 3, a prediction picture, associated with the motion compensation mode as set by the motion prediction circuit 2, is supplied via a field memory group 13 to a motion compensation circuit 14.

The adder 3 performs an arithmetic operation associated with the motion compensation mode. That is, if the motion compensation mode is the intra-picture prediction mode, the 10-bit based picture data block from the field memory group 1 is directly outputted, whereas, if the motion compensation mode is the inter-picture prediction mode, that is one of the forward prediction mode, backward prediction mode or the bi-directional prediction mode, the difference between the 10-bit based picture data block from the field memory group 1 and the prediction picture from the motion compensation circuit 14 (prediction error) is calculated, so that the 10-bit based output of the adder 3 is provided to an adder 4, an in-block representative value calculation circuit 5 and to a block quantization width calculation circuit 6.

The in-block representative value calculation circuit (representative value calculation circuit) 5 calculates, in association with the motion compensation mode supplied from the motion prediction circuit 2 via the motion compensation circuit 14, a representative value data outputted by the adder 3 as later explained, and outputs the calculated data. The block quantization width calculation circuit (quantization width calculation circuit) 6 calculates, in association with the motion compensation mode supplied from the motion prediction circuit 2 via the motion compensation circuit 14, a quantization width Q, with which the output of the adder 3 is quantized by a block quantizer 7, in a manner as will be explained subsequently, and outputs the calculated quantization width Q to the block quantizer 7 and to a block dequantizer 10.

Figure 6:
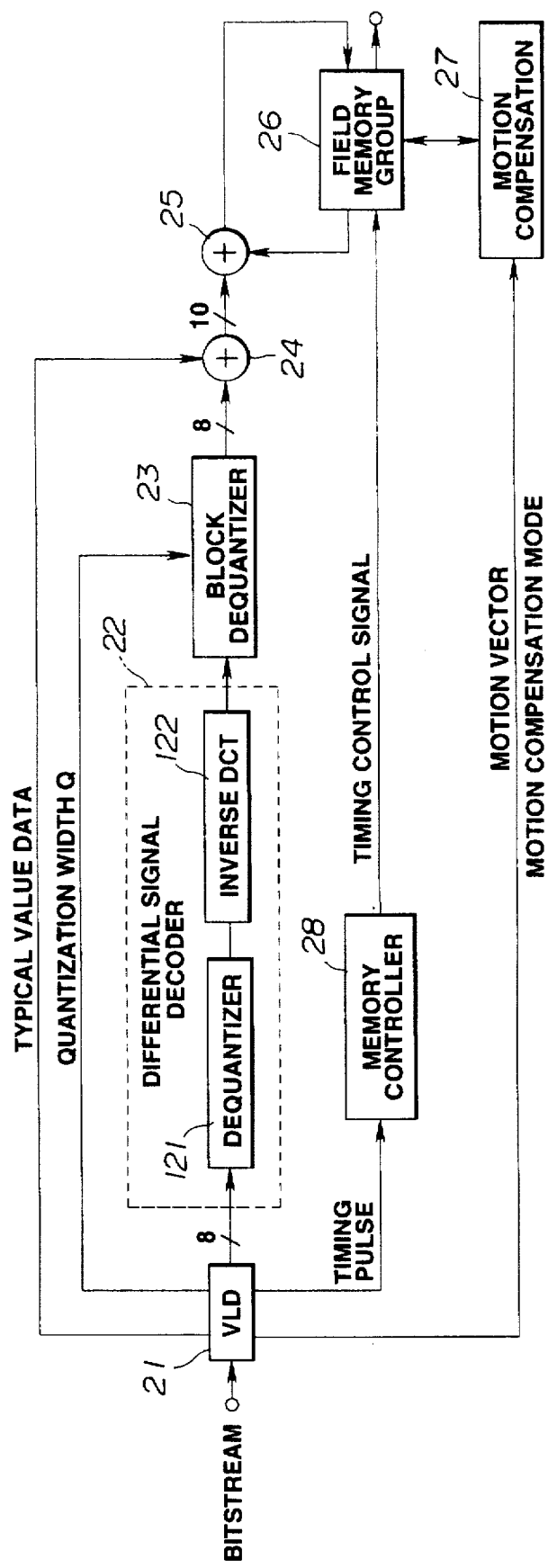
FIG. 6 is a schematic block diagram showing a structure of a picture signal decoding apparatus according to a first embodiment of the present invention.

In the present specification, the quantization width determined by the quantization width calculation circuit 6 is denoted as Q in distinction from the quantization width S in the difference signal encoder 8 and the difference signal decoders 9 and 22 (FIG. 6).

The adder 4 finds a difference between the output of the adder 3 and the representative value data outputted by the representative value calculation circuit 5 and outputs the resulting difference to the block quantizer 7. The block quantizer 7 quantizes the output of the adder 4 with the quantization width Q, that is divides the adder output with the quantization width Q, and outputs the result to the difference signal encoder 8.

The difference signal encoder 8 is made up of a DCT circuit 111 and a quantizer 112. The DCT circuit 111 transforms the quantized data from the block quantizer 7 by DCT for conversion into DCT coefficients. These DCT coefficients, supplied to the VLC circuit 15 previously enter the quantizer 112 so as to be quantized with the quantization width S associated with the data storage quantity in a transmission buffer, not shown, provided downstream of the VLC circuit 115.

It should be noted that 8-bit based picture data needs to be supplied to the DCT circuit 111 of the difference signal encoder 8. That is, if the motion compensation mode is the intra-picture prediction mode, picture data that may be represented by 8 bits for 0 to 255 needs to be supplied to the DCT circuit 111 of the difference signal encoder 8, whereas, if the motion compensation mode is the inter-picture prediction mode, that is one of the forward prediction mode, backward prediction mode or the bi-directional prediction mode, picture data that may be represented by 8 bits plus a sign bit, totalling 9 bits for −255 to 255, needs to be supplied.

Stated differently, picture data entering the apparatus needs to be supplied to the differential signal encoder 8 after conversion of the 10-bit based picture data block into an 8-bit based picture data block.

Thus, if the motion compensation mode is the intra-picture prediction mode, the representative value calculation circuit 5 detects the largest and least values of the outputs of the adder 3, herein a block of 10-bit based picture data from the field memory group 1, and outputs to adders 4 and 11 the least value, for example, as representative value data of the 10-bit based picture data block outputted by the adder 3.

It is unnecessary for the representative value data of the block to be the least value in the block. However, if the motion compensation mode is the intra-picture prediction mode, picture data needs to be represented by 8 bits for 0 to 255. Thus the dynamic range of the block as explained later can be set to a maximum value possible if the least value in the block is selected as the representative data of the block.

The adder 4 calculates a difference between the 10-bit based picture data of a block, outputted by the adder 3, and the representative value data of the block outputted by the representative value calculation circuit 5, that is the least value in the block, and outputs the difference to the block quantizer 7.

Thus, in this case, a block of picture data having 0 as the least value is outputted to the block quantizer 7.

That is, if the motion compensation mode is the intra-picture prediction mode, and if the largest and the least values of a block of 10-bit based picture data outputted by the adder 3 are 500 and 300, respectively, a block of picture data in a range from 0 (=300—300), obtained by subtracting the least value 300 as the representative value data from 300, and 200 (=500–300), obtained by subtracting the least value 300 as the representative value data from 500, is outputted from the adder 4 to the block quantizer 7.

On the other hand, if the largest and the least values of a block of 10-bit based picture data outputted by the adder 3 are 1000 and 300, respectively, a block of picture data in a range from 0 (=300—300), obtained by subtracting the least value 300 as the representative value data from 300, and 700 (=1000–300), obtained by subtracting the least value 300 as the representative value data from 1000, is outputted from the adder 4 to the block quantizer 7.

Simultaneously, the largest value and the least value of the output of the adder 3, herein a block of 10-bit based picture data from the field memory group 1, are detected, and a difference therebetween, as a dynamic range, is calculated.

In the present specification, the dynamic range of a signal means the difference between the largest and the least values of the signal.

The quantization width calculation circuit 6 judges whether or not the dynamic range of a block of 10-bit based picture data from the field memory group 1 is within 8 bits for 0 to 255. If the dynamic range is found to be within 8 bits, the quantization width Q is set to 1 which is outputted to the block quantizer 7.

Figure 4:
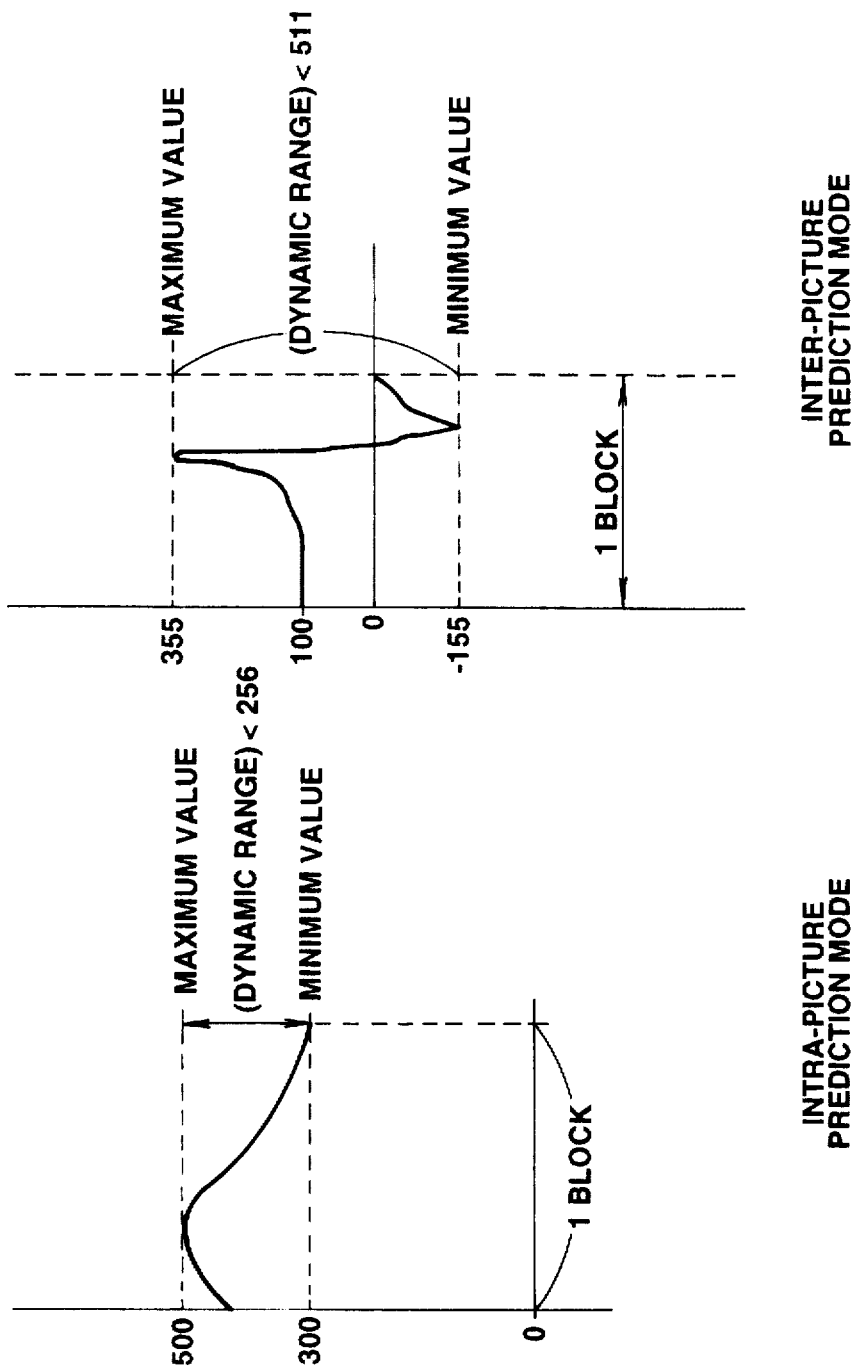
FIGS. 4A and 4B are graphs showing a typical dynamic range of a picture data block.

Thus, if the motion compensation mode is the intra-picture prediction mode, and the dynamic range of a block of 10-bit based picture data is within 8 bits, as in the case of FIG. 4A, the block quantizer 7 directly outputs picture data from the adder 4 to the difference signal encoder 8.

That is, if the motion compensation mode is the intra-picture prediction mode, and the dynamic range of a block of 10-bit based picture data is not larger than 8 bits, the picture data of the block outputted by the adder 3 is substantially based on 8 bits, so that the block of the 8-bit based picture data is outputted to the difference signal encoder 8.

On the other hand, if the motion compensation mode is the intra-picture prediction mode, and if the quantization width calculation circuit 6 judges that the dynamic range of the 10-bit based picture data of the block from the field memory group 1 exceeds 8 bits, that is more than 256, the quantization width Q is determined so that the dynamic range of the quantization output of the block quantizer 7 will be not larger than 8 bits (for 256). The quantization width Q, thus set, is outputted to the block quantizer 7.

That is, if the dynamic range of the 10-bit based picture data from the field memory group 1 is not less than 256 and less than 512, the quantization width Q is set to 2. If the dynamic range is not less than 512 and less than 768, the quantization width Q is set to 3, whereas, if the dynamic range is not less than 768 and less than 1024, the quantization width Q is set to 4.

The quantization method in the block quantizer 7 is explained. If the quantization width Q is 1, the block quantizer 7 performs no processing, so that picture data from the adder 4 is directly outputted to the difference signal encoder 8.

Figure 7:
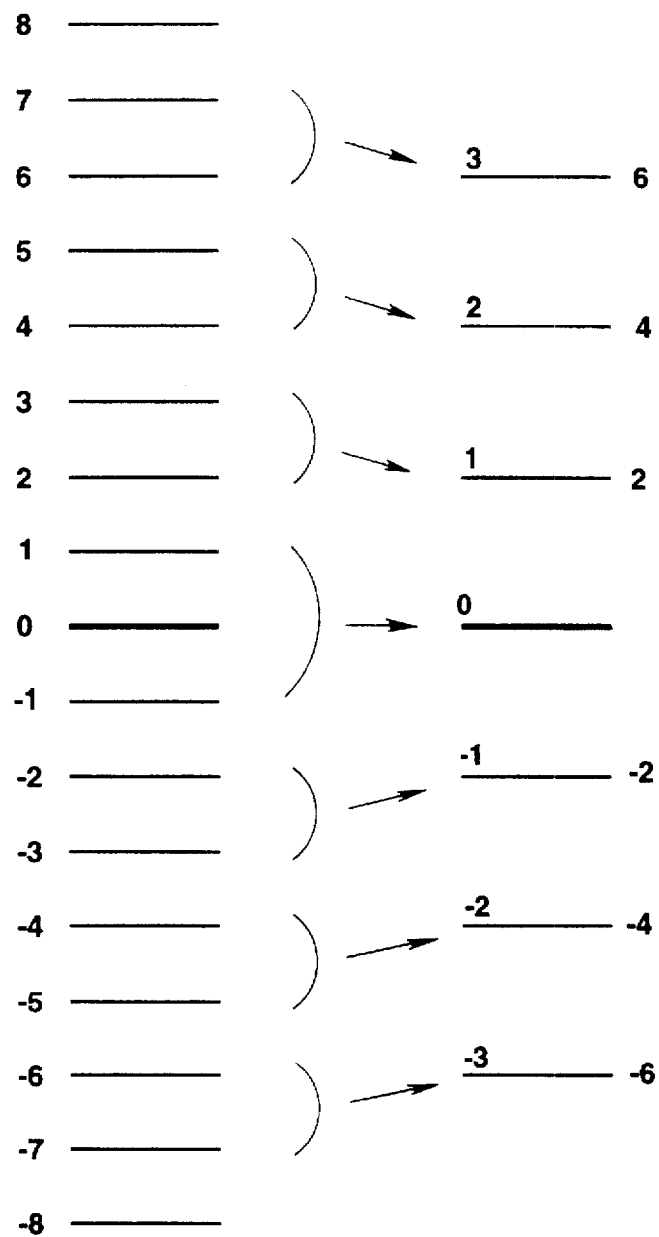
FIG. 7 illustrates changes n signal level caused by quantization by a block quantizer, with the quantization width being 2.

If the quantization width Q is 2, picture data from the adder 4 is divided by the quantization width 2. At this time, the fractional portion is rounded off. FIG. 7 shows transition in signal level. There is produced an error in the quantization width between a signal level near zero and non-zero signal levels.

That is, there are three picture data (1, 0, −1) in picture data having the value of 0 after quantization, whereas there are two picture data having a value of 1 after quantization, that is (2, 3). Thus an quantization error is necessarily produced. However, this one-step error is innate and cannot be removed.

On the other hand, if the quantization width Q is 3, picture data x from the adder 4 is quantized with the quantization width 3. If the picture data x is divisible by 3, a quantization output X is given by $$X=x/3.$$

If the picture data x is indivisible with 3, the fractional portion is rounded off. By this simple rounding off, the quantization error of 2 steps at the maximum is produced, thus significantly deteriorating the picture quality.

According to the present invention, the following processing is employed so that, with the quantization width Q equal to 3 or 4, the quantization error will be within one step, by way of optimization.

Figure 8:
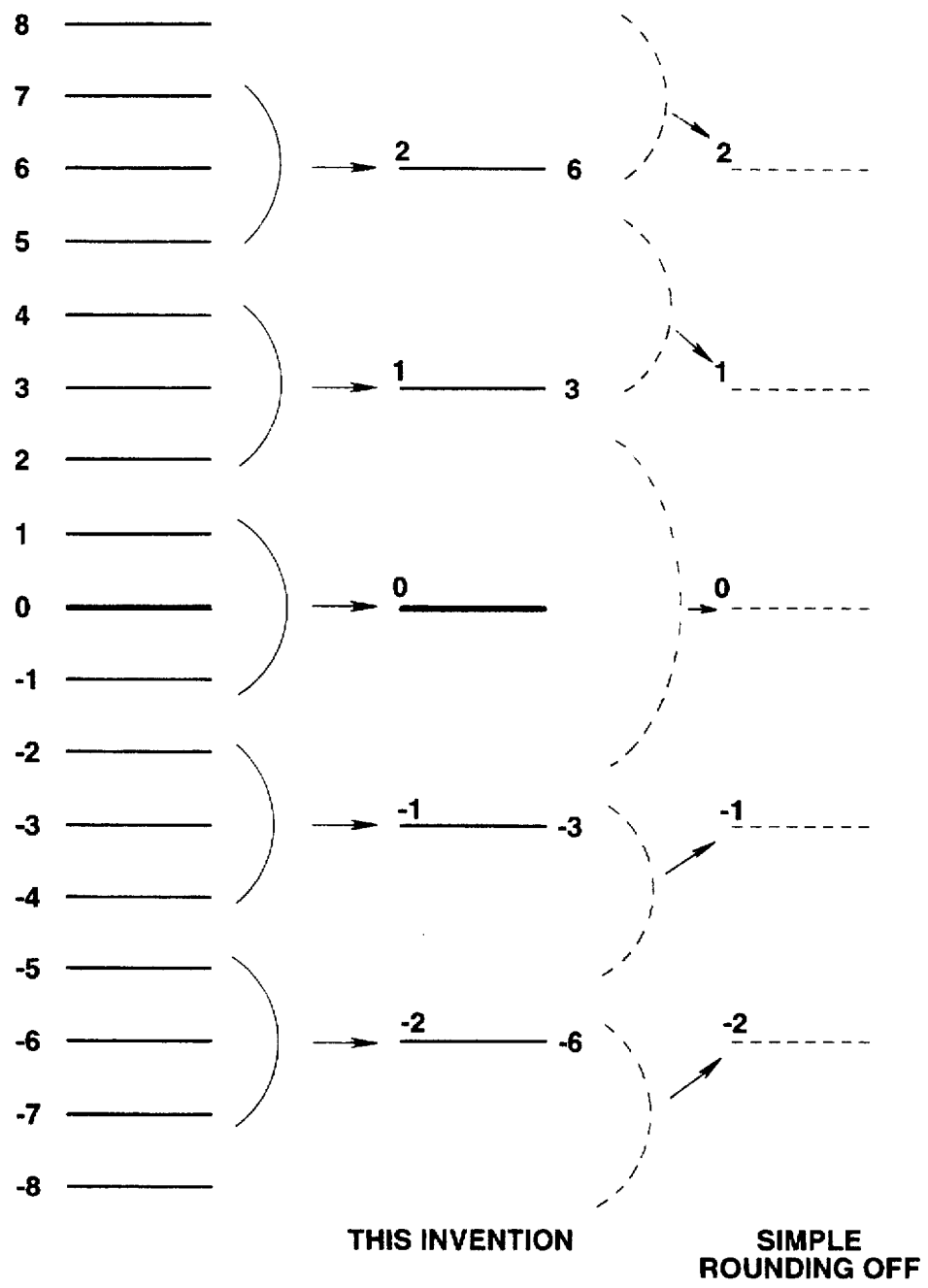
FIG. 8 illustrates changes n signal level caused by quantization by a block quantizer, with the quantization width being 3.

If the quantization width Q is 3, picture data x from the adder 4 is quantized with the quantization width 3 in accordance with the following equations:

$$X=(x+1)/3 \text{ for } (x \geq 0)$$

$$X=(x-1)/3 \text{ for } (x<0)$$

where a quantization output is X. The quantized data is rounded off at the decimal point. FIG. 8 shows the transition in the signal level. It is seen from FIG. 8 that the original picture data is quantized so that the error will be not more than one step at each level.

For reference, the result obtained on simple rounding off is shown by broken lines in FIG. 8, from which it is seen that five picture data (2, 1, 0, −1 and −2) have the value of 0 after quantization, whereas three picture data (3, 4 and 5) have the value of 1 after quantization. Thus the quantization error of two steps is produced in case the result is simply rounded off. The quantization error is diminished to one step according to the present invention.

If the quantization width Q is 4, picture data x from the adder 4 is quantized with the quantization width 4 in accordance with the following equations:

$X=(x+1)/4$ for $(x \geq 0)$ $X=(x-1)/4$ for $(x<0)$

Figure 9:
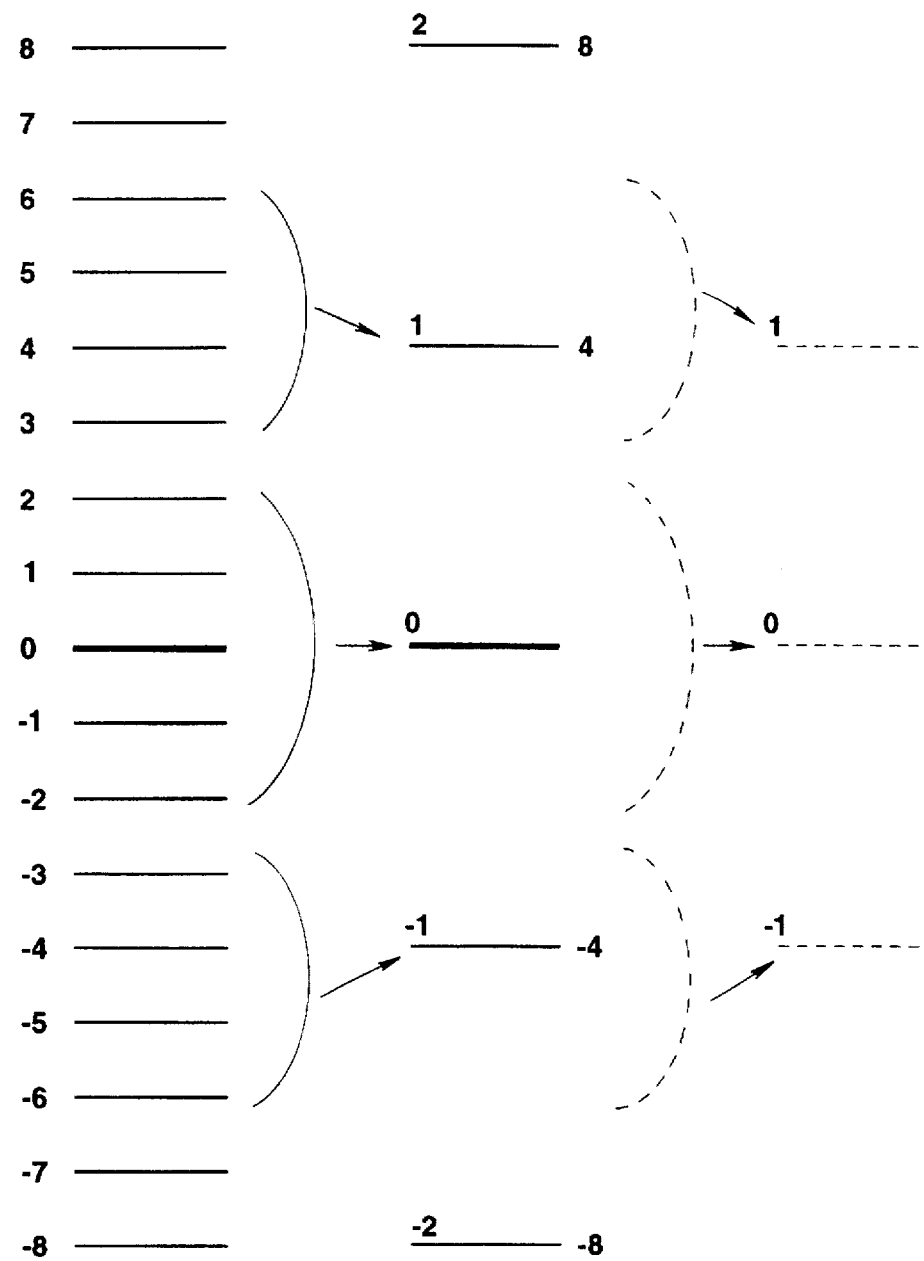
FIG. 9 illustrates changes n signal level caused by quantization by a block quantizer, with the quantization width being 4.

At this time, coefficients below the decimal point are removed. FIG. 9 shows the transition in the signal level. Since the original picture data is quantized with an error of one step, deterioration in the picture quality occurs only to a lesser extent. If the quantization width of an even number is used, the vicinity of 0 and the remaining portion of the of the picture data x intrinsically cannot be quantized at an equal interval. In FIG. 9, the vicinity of 0 becomes wider in quantization width by one step than the remaining portions. However, the picture quality can definitely be improved since the vicinity of 0 becomes wider by three steps in quantization width than the remaining portion of the picture data in case of simple rounding.

If the quantization width Q is 4, quantization can be made in the following manner, as a modification:

$X=(x+2)/4$ for $(x \geq 0)$ $X=(x-2)/4$ for $(x<0)$

Figure 10:
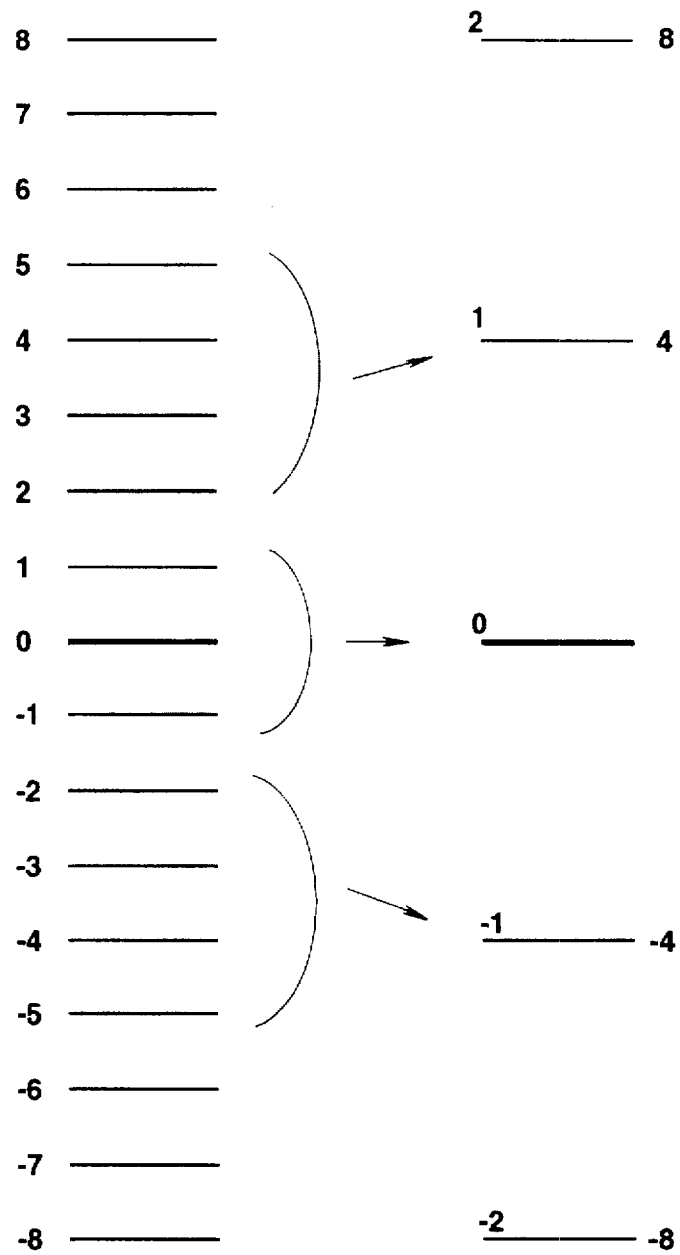
FIG. 10 illustrates changes in signal level caused by modification of quantization by a block quantizer, with the quantization width being 4.

This is illustrated in FIG. 10, from which it is seen that the vicinity of 0 of picture data becomes narrower in quantization width by one step than in the remaining portions. However, the quantization error in this case is one step, as in the example of FIG. 9. It should be noted that the examples of FIGS. 9 and 10 cannot be employed in a hybrid configuration.

It is seen from above that a quantization error E in the vicinity of 0 in case of simple rounding is represented by $E=((Q-1)*2)-(Q-1)$ where Q is the quantization width. Thus it is seen that, since the quantization of a 10-bit based data into 8-bit based data generates a quantization error of three steps at the maximum, in the vicinity of 0, a quantization error of one step may be achieved at all times with significant merits. Since the original picture of high precision produces larger quantization errors, the picture quality may be improved significantly.

As described above, if the motion compensation mode in the intra-picture prediction mode, and the dynamic range of the block of 10-bit based picture data from the adder 4 exceeds 8 bits, that is larger than 256, the block quantizer 7 converts the block of 10-bit based picture data from the adder 4 into a block of 8-bit based picture data, within a range of the quantization error of one step, and outputs the resulting block to the difference signal encoder 8.

On the other hand, if the motion compensation mode is the inter-picture prediction mode, that is one of the forward prediction mode, backward prediction mode or bi-directional prediction mode, the representative value calculation circuit 5 detects the largest value and the least value of addition outputs of the adder 3, herein difference data between the prediction data and the block of 10-bit based picture data from the field memory group 1, and outputs a mean value thereof (=(largest value+least value)/2, with rounding off below the decimal point) to the adders 4 and 11 as representative value data of the block of 10-bit based output picture data of the adder 3.

The representative value data of a block may also be the least value of the block or 0, instead of the mean value between the largest and smallest values of pixels in the block. However, if the motion compensation mode is the inter-picture prediction mode, in which picture data need to be represented by 9 bits for −255 to 255, as described previously, the block dynamic range may be maximized by employing the mean value of the block as its representative value data.

The adder 4 finds a difference between the block of 10-bit based picture data outputted by the adder 3, more precisely, picture data in the block, and the representative value data of the block outputted by the representative value calculation circuit 5, that is the mean value of the block, and outputs the resulting difference to the block quantizer 7.

Thus, in this case, the block of picture data having absolute values of the largest and smallest values equal to each other is outputted to the block quantizer 7.

That is, if the motion prediction mode is the inter-picture prediction mode, and the smallest and largest values of the 10-bit picture data of the block, outputted by the adder 3, are −155 and 355, respectively, a block of picture data having a range of values from −255 (=−155−100) to 255 (=355−100) obtained on subtracting a mean value as the representative value data of 100 (=(−155+355)/2) from the picture data block, is outputted from the adder 4 to the block quantizer 7, as shown for example in FIG. 4B.

Figure 5:
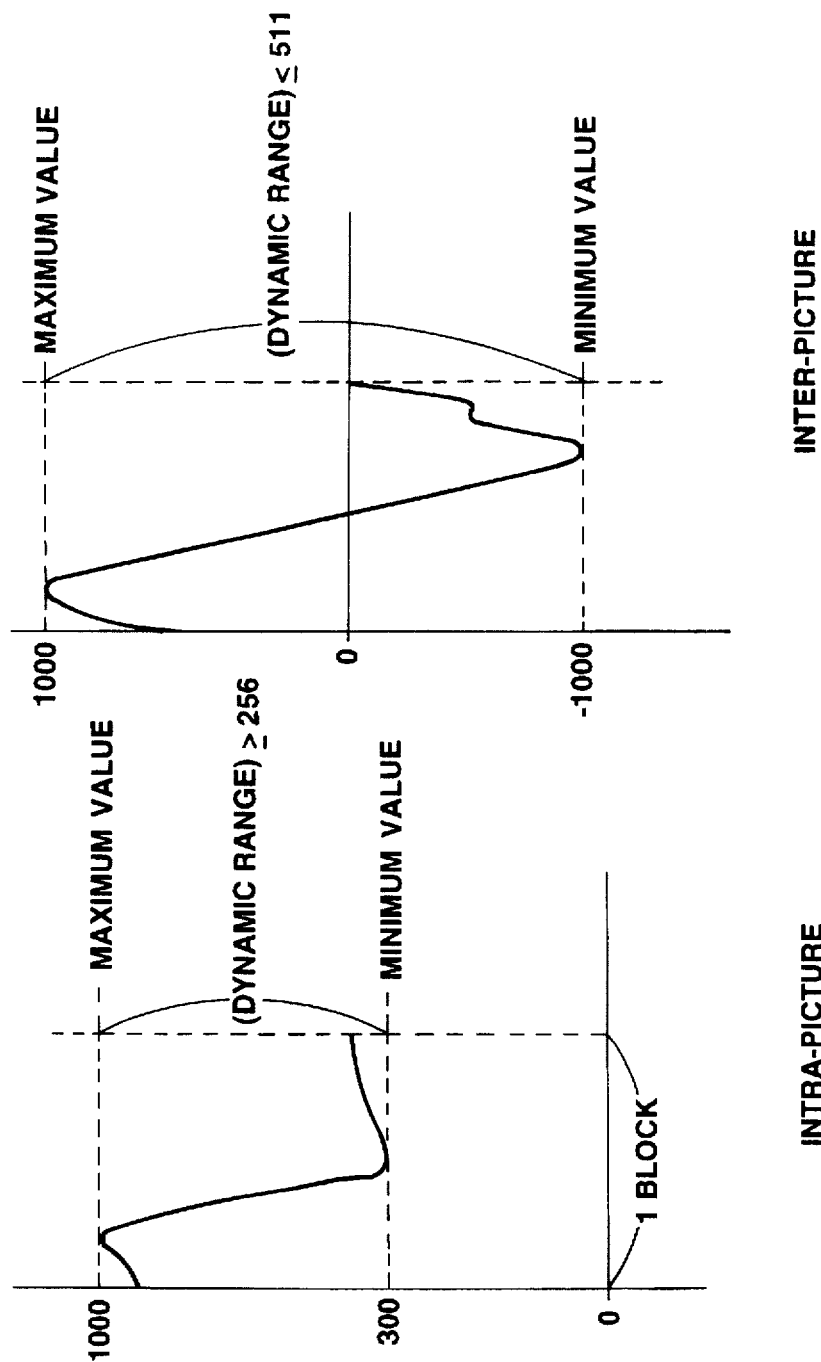
FIGS. 5A and 5B are graphs showing another typical dynamic range of a picture data block.

If, the largest and smallest values of a block of 10-bit based picture data outputted from the adder 3 are 1000 and −1000, respectively, a block of picture data having values in the range from −1000 (=−1000−0) to 1000 (=1000−0), with a mean value being 0 (=(−1000+1000)/2) is outputted to the block quantizer 7, as shown for example in FIG. 5B.

Simultaneously, the quantization width calculating circuit 6 detects the largest and smallest values of an addition output of the adder 3, herein difference data between the block of 10-bit based picture data from the field memory group 1 and the prediction picture, and calculates the difference therebetween as a dynamic range.

The quantization width calculation circuit 6 judges whether or not the dynamic range of the block of 10-bit based picture data from the field memory group 1 is within 9 bits, inclusive of a sign bit, capable of representing values ranging from −255 to 255. If the dynamic range is within 9 bits, the quantization width Q is set to 1 and outputted to the block quantizer 7.

Thus, if the motion compensation mode is the inter-picture prediction mode, and the dynamic range of the block of 10-bit based picture data (difference data) outputted by the adder 3, as shown for example in FIG. 4A, the block quantizer 7 directly outputs picture data from the adder 4 to the difference signal encoder 8.

Stated differently, if the motion compensation mode is the inter-picture prediction mode, and the dynamic range of the block of 10-bit based picture data outputted by the adder 3 is not more than 9 bits, block picture data outputted by the adder 3 is substantially 8 bits. It is the block of the 8-bit based picture data that is outputted to the difference signal encoder 8.

In addition, if the motion compensation mode is the inter-picture prediction mode, and the quantization width calculation circuit 6 judges that the dynamic range of the block of the 10-bit based picture data from the field memory group 1 exceeds 9 bits, that is outside a range from −255 to 255, the quantization width Q is set so that the dynamic range of the quantization output of the block quantizer 7 will be not larger than 9 bits or less than 511, that is so that the dynamic range will be in a range from −255 to 255. The quantization width Q thus set is outputted to the block quantizer 7.

That is, if the dynamic range of the block of the 10-bit based picture data from the field memory group 1 is not less than 512 and less than 1024, the quantization width Q is set to 2. If the dynamic range is not less than 1024 and less than 1536, the quantization width Q is set to 3, whereas, if the dynamic range is not less than 1536 and less than 2048, the quantization width Q is set to 4.

If the motion prediction mode is the inter-picture prediction mode, the block quantizer 7 the block picture data by the same rounding-off as explained with reference to FIGS. 7 to 10.

As described above, if the motion prediction mode is the inter-picture prediction mode, and the dynamic range of the block of the 10-bit based picture data from the adder 4 exceeds 9 bits, that is not less than 512, the block quantizer 7 converts the block of 10-bit based picture data from the adder 4 into a block of 8-bit based picture data which is outputted to the difference signal encoder 8.

As described above, if a block of 10-bit based picture data enters an apparatus, the adder 4 and the block quantizer 7 convert the block into a block of 8-bit based picture data so that the 8-bit based picture data block will be supplied to the difference signal encoder 8.

Meanwhile, if a picture with a bit definition higher than 8, such as a 10-bit based picture, is divided into small-sized blocks, such as 8×8 or 16×16 pixels, the dynamic range in each block becomes generally larger. The reason is that, if the motion prediction mode is the intra-picture prediction mode, the dynamic range of the block becomes smaller than 8 bits, whereas, if the motion prediction mode is the inter-picture prediction mode, the dynamic range of the block becomes smaller than 9 bits. In addition, if the motion prediction mode is the inter-picture prediction mode, the difference is taken in the adder 3 between the picture data block and the prediction picture. Thus the dynamic range of the difference block exceeds 9 bits on only rare occasions.

Thus, by subtracting the representative value data from the block picture data by the adder 4, 10-bit based picture data can be converted in most cases into 8-bit based picture data without impairing the information.

That is, 10-bit based picture data may be converted into 8-bit based picture data without impairing the picture even if the apparatus is constructed without using the quantization width calculation circuit 6 or the block quantizer 7.

In this case, picture encoding can be achieved by reducing or refining the quantization width S at the difference signal encoder 8 for suppressing deterioration in picture quality.

It should be noted that, if the dynamic range of a picture data block is larger, that is if the motion prediction mode is the intra-picture prediction mode and the dynamic range of the block exceeds 8 bits, or if the motion prediction mode is the inter-picture prediction mode and the dynamic range of the block exceeds 9 bits, a picture obtained on quantizing picture data by the block quantizer 7 and decoding the picture data is slightly deteriorated in resolution.

However, as for a rim portion of a picture where the dynamic range is larger, the human eye is low in luminance discrimination. Thus it may be presumed that deterioration in the level direction caused by quantization has only little effects on the audience.

The picture data converted from the 10-bit based data into 8-bit based data is supplied to the difference signal encoder where it is quantized and DCTed so as to be supplied to the variable length coding (VLC) circuit 15.

The VLC circuit 15 is supplied with representative value data and the quantization width Q of the picture data block, quantized and DCTed by the difference signal encoder 8, from the representative value calculation circuit 5 and the quantization width calculation circuit 6, respectively, in addition to the picture data block. The VLC circuit 15 is also supplied with the motion vector and the motion compensation mode from a motion prediction circuitry.

In addition, the VLC circuit 15 is supplied with the quantization width S at the difference signal encoder 8. The VLC circuit 15 variable length encodes the block of picture data converted from 10-bit based data to 8-bit based data, as well as the representative value data, quantization width Q quantization width S, motion vector and the motion compensation mode, and transmits the resulting data to a transmission buffer, not shown.

To a header of each block of the encoded picture data, the representative value data and the quantization width Q of the block are appended by the VLC circuit 15.

Instead of appending the representative value data and the quantization width Q of the block to the header of the block as described above, the representative value data and the quantization width Q may also be appended to the header of a layer of the upper order with respect to the block, such as to the header of a macro-block layer or a picture layer, along with the representative value data and the quantization width Q of other blocks belonging to the macro-block layer or the picture layer.

The VLC circuit 15 outputs a bitstream.

If picture data quantized and DCTed by the difference signal encoder 8 is data of the I- or P-pictures, it is supplied to the difference signal decoder 10.

As in FIG. 1, the difference signal decoder 9 is made up of a dequantizer 113 and an inverse DCT circuit 114 where data from the difference signal encoder 8, that is quantized DCT data, is dequantized with the same quantization width as the quantization width S in the difference signal encoder 8 and subsequently processed with inverse DCT.

The picture data outputted by the difference signal decoder 9 enters the block dequantizer 10 where it is dequantized with the same quantization width as the quantization width Q for the bock quantizer 7 outputted from the quantization width calculation circuit 6. That is, the picture data outputted by the difference signal decoder 9 is multiplied with the quantization width equal to the quantization width Q for the block quantizer 7. The resulting product data is outputted to the adder 11.

The adder 11 sums to picture data outputted by the block dequantizer 10 the same representative value data as the representative value data outputted by the representative value calculation circuit 5 and subtracted by the adder 4 from the output of the adder 3. The resulting addition data is outputted to the adder 12.

Thus the adder 12 is fed with the same picture data block as the 10-bit based picture data prior to conversion by the adder 4 and the block quantizer 7 into a block of 8-bit based picture data block. More precisely, the picture data supplied to the adder 12 is approximately the same as the 10-bit based picture data block if the quantization error is taken into account.

The adder 12 is also fed with a prediction picture already decoded and motion-compensated by the motion compensation circuit 14. The adder adds the prediction picture to picture data from the adder 11 for decoding into the original 10-bit based picture data, that is the 10-bit based picture data prior to encoding. The decoded 10-bit based picture data is supplied to and stored in the field memory group 13.

The field memory group 13 is configured for storing 10-bit based picture data. The 10-bit based picture data, stored in the field memory group 13 and already decoded, is read out based upon a timing control signal generated in timed relation to synchronization signals of the input picture by the field controller 16. The 10-bit picture data, thus read out, is motion-compensated by the motion compensation circuit 14 depending upon the motion vector from the motion prediction circuit 2 and thence supplied to the adders 3 and 12. That is, a prediction picture is supplied to the adders 3 and 12.

Since the 10-bit based picture data is converted into 8-bit based picture data as described above, the 10-bit based picture may be encoded without deteriorating its picture quality by a picture encoding apparatus employing the motion prediction circuit 2 for 8-bit based picture data and difference signal encoders 8 and 9.

The picture data encoded by the above-described picture encoding method or apparatus may be recorded on disc-shaped recording media, such as an optical disc or a magneto-optical disc, or a tape-shaped recording medium. The optical disc may be mass-produced by preparing a master disc by cutting and duplication from the master disc by a stamper.

FIG. 6 shows, in a block diagram, an arrangement of a picture signal decoding apparatus for decoding a bitstream formed by the first embodiment of the present invention.

Figure 2:
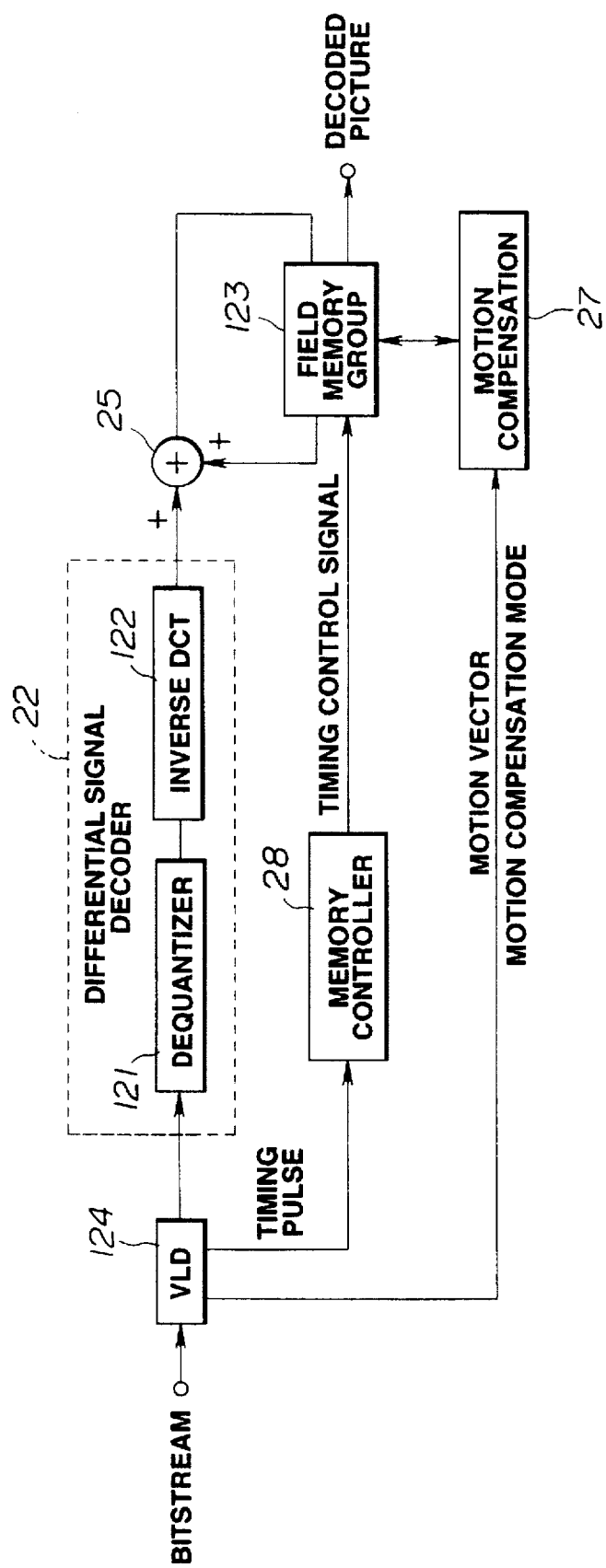
FIG. 2 is a schematic block diagram showing a structure of a picture signal decoding apparatus.

In FIG. 6, parts or components corresponding to those shown in FIG. 2 are denoted by the same numerals. The picture signal decoding apparatus is configured for decoding a picture encoded by the picture encoding apparatus as shown in FIG. 3.

In the present picture signal decoding apparatus, a reproduced bitstream is supplied to the VLD circuit 21. The VLD circuit then variable length decodes the bitstream supplied thereto, and transmits representative value data and the quantization width Q of the block appended to each block header to the quantizer 24 and to the block dequantizer 23, respectively, while supplying the motion vector and the motion compensation mode to the motion compensation circuit 27.

The VLD circuit 21 also outputs a timing pulse to the memory controller 28 each time it completes variable length decoding of data corresponding to a sole picture. The memory controller 28 transmits a timing control signal to the field memory group 26 in timed relation to the timing pulse. This controls the readout timing of picture data from the field memory group 26.

The VLD circuit 21 sequentially transmits the block of variable length decoded picture data and the quantization width S to the difference signal decoder 22.

The difference signal decoder 22 is made up of a dequantizer 121 and an inverse DCT circuit 122, as in FIG. 2. In difference signal decoder 22, a block of picture data from the VLD circuit 21 converted from 10-bit based picture data into 8-bit based picture data (quantized DCT data) is dequantized with the quantization width S outputted from the VLD circuit 21 and further processed with inverse DCT.

The input/output picture data to and from the difference signal decoder 22 is data converted into 8-bit based data. Thus it is possible with the difference signal decoder 22 to dequantize the 8-bit based picture data and to process the dequantized picture data with inverse DCT.

The block of picture data, outputted by the difference signal decoder 22, enters the block dequantizer 23, where it is dequantized with the quantization width equal to the quantization width Q used in the bock quantizer 7 shown in FIG. 3. That is, the block dequantizer 23 multiplies output picture data of the difference signal decoder 22 with the quantization width equal to the quantization width Q used in the quantization by the block quantizer 7.

This converts the dynamic range of the picture data block into a value substantially equal to the value which prevailed prior to encoding by the picture signal encoding apparatus shown in FIG. 3.

The picture data block dequantized by the bloc dequantizer 23 is supplied to the adder 24. The adder 24 adds the representative value data from the VLD circuit 21 to the picture data block from the block dequantizer 23, in effect picture data of the picture data block, to each other, and outputs the addition value to an adder 25.

Similarly to the adder 12 of the picture signal encoding apparatus shown in FIG. 3, the adder 25 is supplied with the picture data block which is substantially the same as the block of 10-bit based picture data prior to being converted by the adder 4 and the block quantizer 7 into the 8-bit based picture data block.

That is, in the block dequantizer 23 and the adder 24, the 8-bit based picture data, converted from the 10-bit based picture data by the picture signal encoding apparatus of FIG. 3, is converted into 10-bit based picture data, which is supplied o the adder 25.

The adder 25 is also supplied with picture data of the I- or P-picture previously decoded and motion-compensated by the motion compensation circuit 27. The prediction picture is added to picture data from the adder 24 for decoding into the original 10-bit based picture data, that is 10-bit based picture data prior to encoding. The decoded 10-bit bases picture data is supplied to and stored in the field memory group 26.

The field memory group 26 is configured for storing 10-bit based picture data and stores the decoded 10-bit based picture data from the adder 25. Of the 10-bit based picture data, decoded and stored in the field memory group 26, picture data of the I- or P-picture are read out on the basis of the timing control signal generated by the field memory controller 28 in timed relation to the synchronization signal of the input picture. Thus the I- or P-picture is motion-compensated by the motion compensation circuit 14 depending upon the motion vector from the motion prediction circuit 2 and is transmitted to the adder 25. In this manner, the prediction picture is transmitted to the adder 25.

The picture data stored in the field memory group 26 is outputted to an output terminal based upon the timing control signal from the field memory controller 28. The picture data outputted at the output terminal is processed with, for example, D/A conversion, and is supplied to and displayed on a display unit, not shown.

The 10-bit based picture of higher definition than the 8-bit picture, encoded by the picture signal encoding apparatus of FIG. 3, can be decoded in this manner by the picture signal decoding apparatus employing, for example, the difference signal decoder 22 for 8-bit based picture data.

Meanwhile, it is possible with the picture signal encoding apparatus shown in FIG. 3 or the picture signal decoding apparatus shown in FIG. 6 to encode or decode not only a 10-bit based picture but also a 9-bit based picture or a 11-bit based picture, for example, respectively.

Referring to FIGS. 11 to 14, the format of a bitstream outputted by the picture signal encoding apparatus of the instant embodiment, that is the transmission sequence of the encoded data, is now explained.

FIGS. 11 to 14 show the format comprised of the standard format, that is the format for the bitstream of MPEG-2 Video, and the underlined portions affixed thereto.

The format shown in FIG. 11 shows a sequence header to which ia added extension data (extension_ data) as shown in FIG. 12. The sequence extension (sequence_ extension) is shown in FIG. 13. This is a format for indicating whether or not the encoded picture is an ordinary 8-bit based picture, and is comprised of the sequence header of a standard format to which is appended a flag extension__bit__input, indicated by L1.

If the encoded picture is an ordinary 8-bit based picture, 0, for example, of 0 and 1, is set in the flag extension__bit__input. If the encoded picture is not an ordinary 8-bit based picture, 1, for example, of 0 and 1, is set in the flag extension bit__input.

The format shown in FIG. 14 represents a macro-block header and is a format for transmitting, for each macro-block (16×16 pixel block), the representative value data and the quantization width Q of the blocks constituting the macro-block. The format is comprised of a header for a macro-block layer of the standard format to which is appended a portion indicated by L2.

If the number of blocks making up the macro-block is m, m A-bit representative value data are set in a code block__base, so that the code block__base is defined as an A*m bit code.

Also, m 3-bit quantization widths are set in a code block q__scale, so that the code block__q__scale is defined in the macro-block layer header as a 3*m bit code.

A second embodiment of the present invention is now explained.

Figure 15:
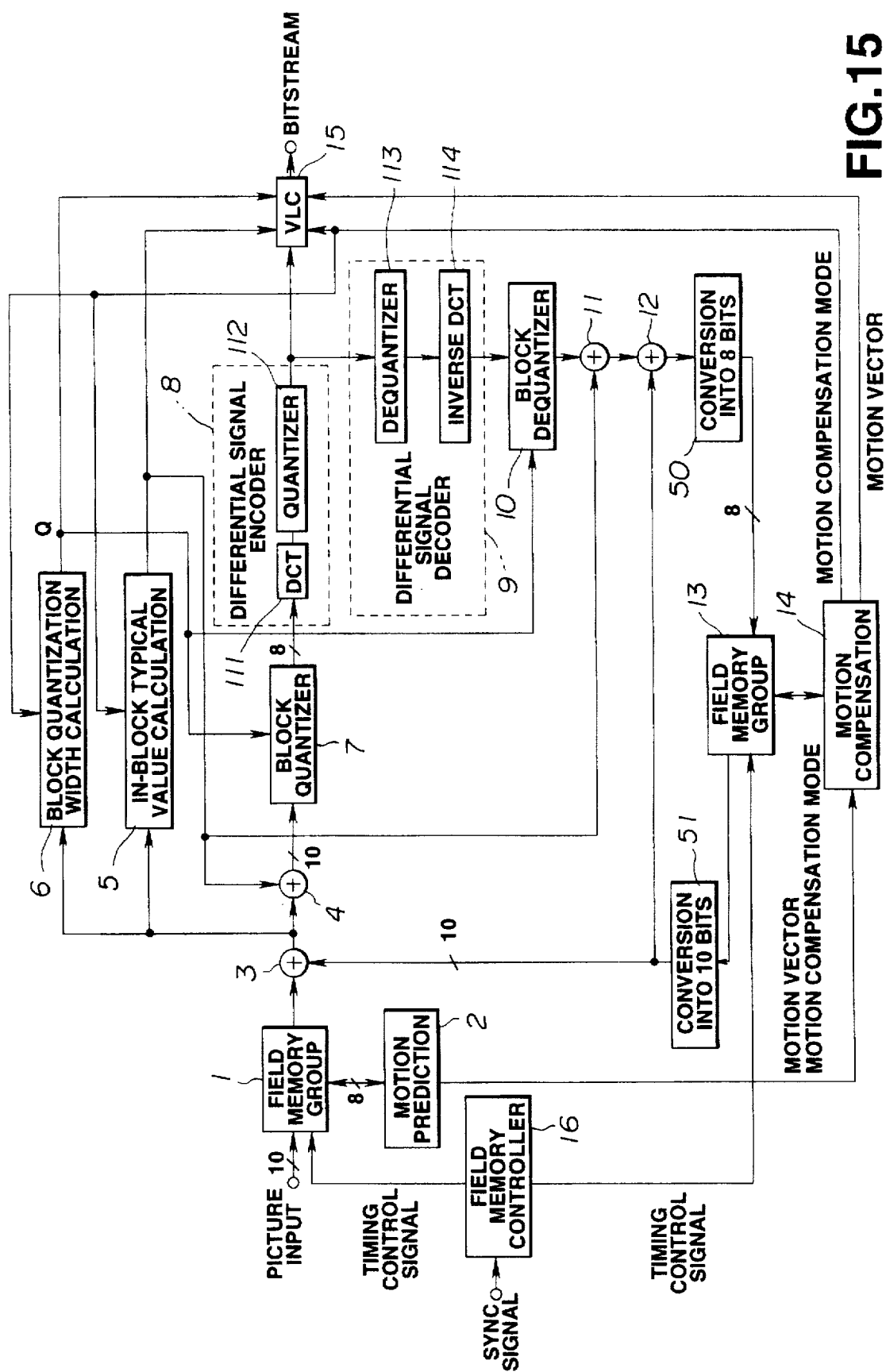
FIG. 15 is a schematic block diagram showing a structure of a picture signal encoding apparatus according to a second embodiment of the present invention.

FIG. 15 shows, in a block diagram, an arrangement of a picture signal encoding apparatus according to the second embodiment of the present invention. In FIG. 15, parts or components corresponding to those of FIG. 1 are denoted by the same numerals and the corresponding description is not made for simplicity.

The second embodiment differs from the first embodiment in that the field memory group 13 is adapted for storing 8-bit based picture data.

The adder 12 is supplied with a prediction picture previously decoded and motion-compensated by the motion compensation circuit 14, so that the prediction picture and picture data from the adder 11 are summed for decoding into original 10-bit based picture data, that is the 10-bit based picture data prior to encoding. The 10-bit based picture data, thus decoded, are entered to a convert-to-8-bit circuit 50.

The convert-to-8-bit circuit 50 converts the 10-bit based picture signal into the 8-bit based picture signal. In the instant embodiment, the convert-to-8-bit circuit 50 is constituted by, for example, a shifter. The LSB side two bits of the 10-bit picture signal x are removed by bit shift so that MSB side 8 bits are outputted as an 8-bit based picture signal X. This may be represented in a C-language writing format by the equation:

$$X=(x>>2).$$

The picture signal, converted by the convert-to-8-bit circuit 50, is supplied to and stored in the field memory group 13.

The field memory group 13 is configured for storing 8-bit based picture data.

The 8-bit picture data, previously decoded and stored in the field memory group 13, are read out based upon the timing control signal generated in association with synchronization signals of the input picture, and are motion-compensated by the motion compensation circuit 14 depending upon the motion vector from the motion prediction circuit 2 so as to be supplied to a convert-to-10-bit circuit 51.

The convert-to-10-bit circuit 51 converts the 8-bit based picture signal to a 10-bit based picture signal. In the instant embodiment, the convert-to-10-bit circuit 51 is constituted by a shifter which appends 2 bits 0 to the LSB side of the 8-bit signal. This may be represented by the C-language writing format by the following equation:

$$X=(x<<2).$$

The picture signal converted by the convert-to-10-bit circuit 51 to 10-bit based picture data is supplied to the adders 3 and 12. That is, the prediction picture is supplied to the adders 3 and 12.

Since the 10-bit based picture data is converted into 8-bit based picture data which is stored in the field memory group 13, the 10-bit based picture may be encoded without substantially deteriorating the picture quality by the picture signal encoding apparatus employing the motion prediction circuit 2 for 8-bit based picture data, difference signal encoder 8 or the difference signal decoder 9.

Figure 16:
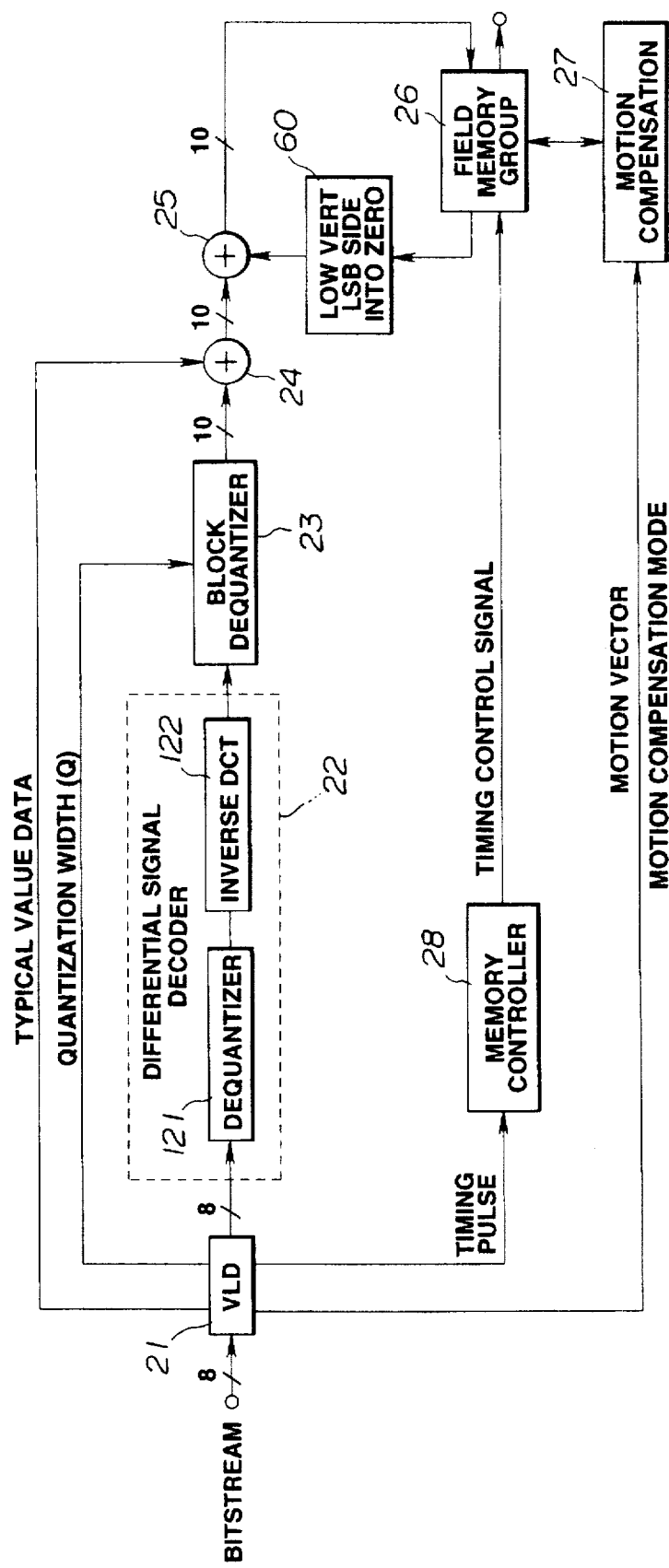
FIG. 16 is a schematic block diagram showing a structure of a picture signal decoding apparatus according to a second embodiment of the present invention.

FIG. 16 shows, in a block diagram, an arrangement of a picture signal decoding apparatus for decoding a bitstream formed by the second embodiment of the present invention.

In FIG. 16, parts or components corresponding to those shown in FIG. 2 are denoted by the same numerals. The picture signal decoding apparatus is configured for decoding a picture encoded by the picture encoding apparatus as shown in FIG. 3.

Of the 10-bit picture data, previously decoded and stored in the field memory group 26, picture data of the I- or P-picture are read out based upon the timing control signal generated in association with synchronization signals of the input picture by the field memory controller 28, and are motion-compensated by the motion compensation circuit 14 depending upon the motion vector from the motion prediction circuit 2 so as to be supplied via a convert-LSB-side-to-0 circuit 60 to the adder 25.

Of the 10-bit signal, the MSB side 8 bits are stored and two LSB side bits are set to 0 by the convert-LSB-side-to-0 circuit 60. This may be represented by the C-language writing format by the equation:

$$X=((x>>2)<<2).$$

An output of the convert-LSB-side-to-0 circuit 60 is supplied to the adder 25. That is, prediction picture is supplied to the adder 25.

The picture data stored in the field memory group 26 is outputted at an output terminal based upon the timing control signal from the field memory controller 28. The picture data outputted at an output terminal is processed by, for example, D/A conversion, and supplied to a display unit, not shown, for display.

It is possible in this manner with the picture signal decoding apparatus employing the difference signal decoder 22 for 8-bit based picture data to decode a 10-bit based picture of higher definition than an 8-bit based picture produced by encoding by the picture signal encoding apparatus shown in FIG. 3.

Meanwhile, it is possible with the picture signal encoding apparatus shown in FIG. 3 or the with the picture signal decoding apparatus shown in FIG. 6 to encode or decode not only a 10-bit based picture but also a 9-bit based picture or an 11-bit based picture.

The syntax of the bitstream in the second embodiment is similar to that of the above-described first embodiment.

A third embodiment according to the present invention is now explained.

Figure 17:
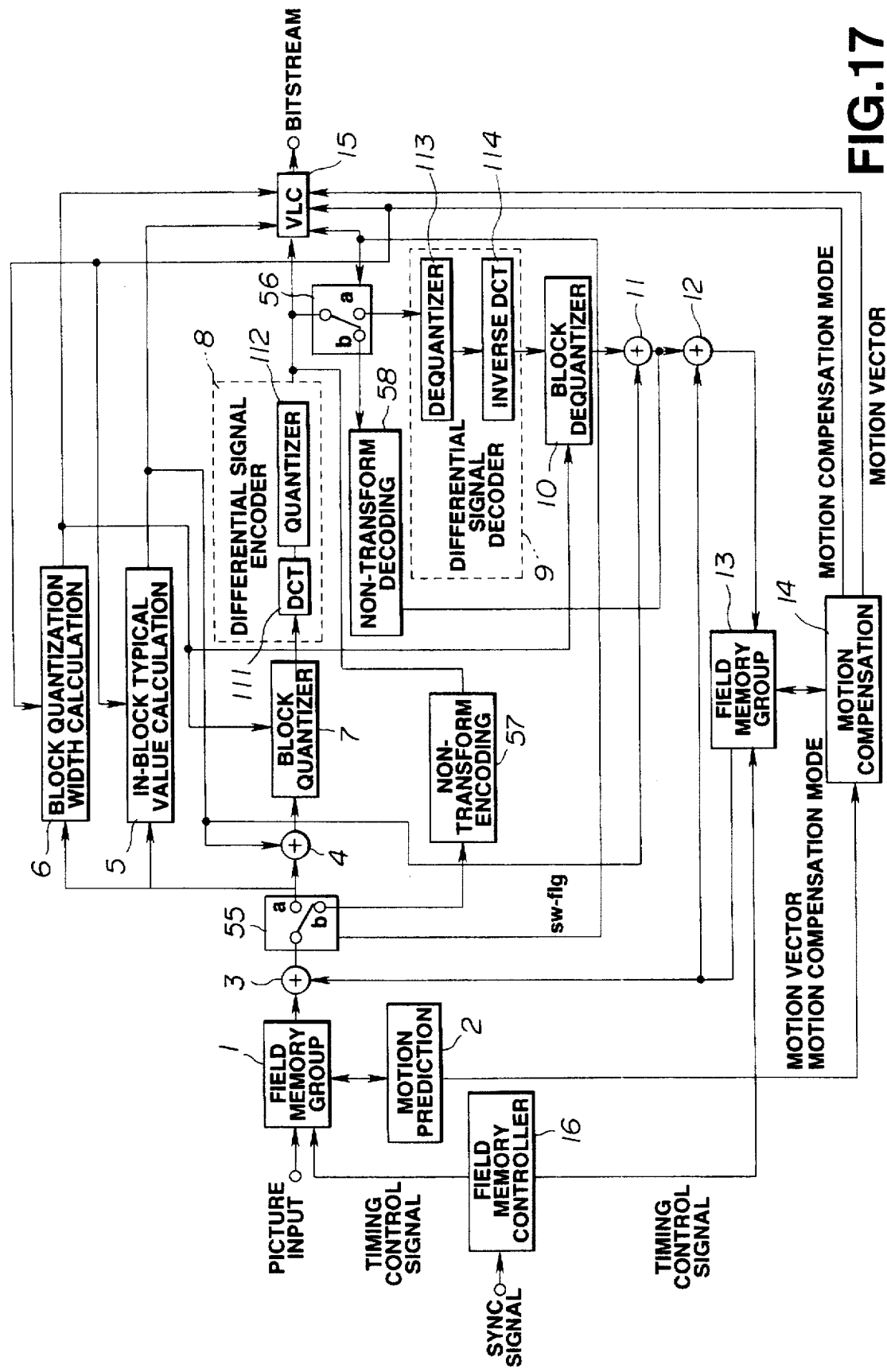
FIG. 17 is a schematic block diagram showing a structure of a picture signal encoding apparatus according to a third embodiment of the present invention.

FIG. 17 shows a picture signal encoding apparatus according to the third embodiment of the present invention. The present third embodiment is a modification of the first embodiment.

With the present third embodiment, the encoding method exploiting DCT conversion may be adaptively switched to the encoding method not exploiting DCT conversion or vice versa.

The purpose of encoding original high-definition picture data such as 10-bit based picture signals into 8-bit based picture signals in such a manner as to avoid deterioration of the picture quality as far as possible is inherently to maintain the picture quality of the original picture data. However, if DCT is used, DCT processing precision differs from one DCT apparatus to another, while the results of processing of real values are rounded off to integers. Thus the encoding cannot be achieved to high precision, while reversible encoding cannot be realized.

It is possible with the third embodiment to perform the conversion of high-precision picture data, such as a 10-bit picture signal, into an 8-bit picture signal, or to perform reversible encoding, responsive to the input signal, or to a request made by the user.

The present third embodiment is similar—to the first embodiment except that the third embodiment includes changeover switches 55, 56, a non-transform encoding circuit 57 and a non-transform decoding circuit 58.

The changeover switch 55 switches an output of the adder 3 to a terminal a or to a terminal b. If the switch 55 is set to the terminal a, that is to the transform encoding, the output of the adder 3 is supplied to the adder 4, in-block representative value calculation circuit 5 and to a quantization width calculation circuit 6. In such case, the third embodiment operates in a manner similar to the first embodiment.

If the changeover switch 55 is set to the terminal b, the output of the adder 3 is outputted to the non-transform encoding circuit 57.

A switch flag SW_ FLG, specifying to which of the terminals a and b the changeover switch 55 is set, is outputted to the VLC 15 and to the changeover switch 56.

The non-transform encoding circuit 57 is now explained. If the picture data is 8-bit based data, an output of the adder 3 is of 9 bits, inclusive of a sign bit. This output, DCTed by the DCT 111, is of 12 bits. Thus the 12-bit variable length codes are provided in the VLC 15. Therefore, if the output of the adder 3 is of not larger than 12 bits, the output can be directly entered to the variable length encoder 15 for variable length encoding.

Thus the non-transform encoding circuit 57 encodes an output of the adder 3 by an encoding method capable of decoding into original data, such as sub-band splitting or run-length encoding. Alternatively, the output of the adder 3 is directly outputted to the VLC 15 and to the changeover switch 56. Since DCT is not executed, reversible encoding can be performed. As a variation of the non-transform encoding circuit 57, prediction coding may also be executed, in which case the difference of neighboring pixels is outputted from the non-transform encoding circuit 57.

The changeover switch 56 is operatively associated with the changeover switch 55. That is, if the changeover switch 55 is connected to the terminal a, the changeover switch 56 is connected to the terminal a. If the changeover switch 55 is connected to the terminal b, the changeover switch 56 is connected to the terminal b. This operation is executed depending upon the flag SW_ FLG transmitted from the changeover switch 55.

If the changeover switch 56 is connected to the terminal a, that is if the transform coding is selected, the third embodiment operates in a similar manner to the first embodiment.

If the changeover switch 56 is set to the terminal b, non-transform encoding is selected, that is an output of the changeover switch 56 is outputted to the non-transform decoding circuit 58. The non-transform decoding circuit 58 outputs a signal of the changeover switch 56 directly to the adder 12. As a variation of the non-transform decoding circuit, prediction-coded signals from the non-transform encoding circuit are decoded by the non-transform decoding circuit. That is, difference values are added to the previously decoded adjacent pixels. The resulting output is similarly supplied to the adder 12.

Otherwise, the operation is similar to that of the first embodiment and hence is not explained for simplicity.

Figure 18:
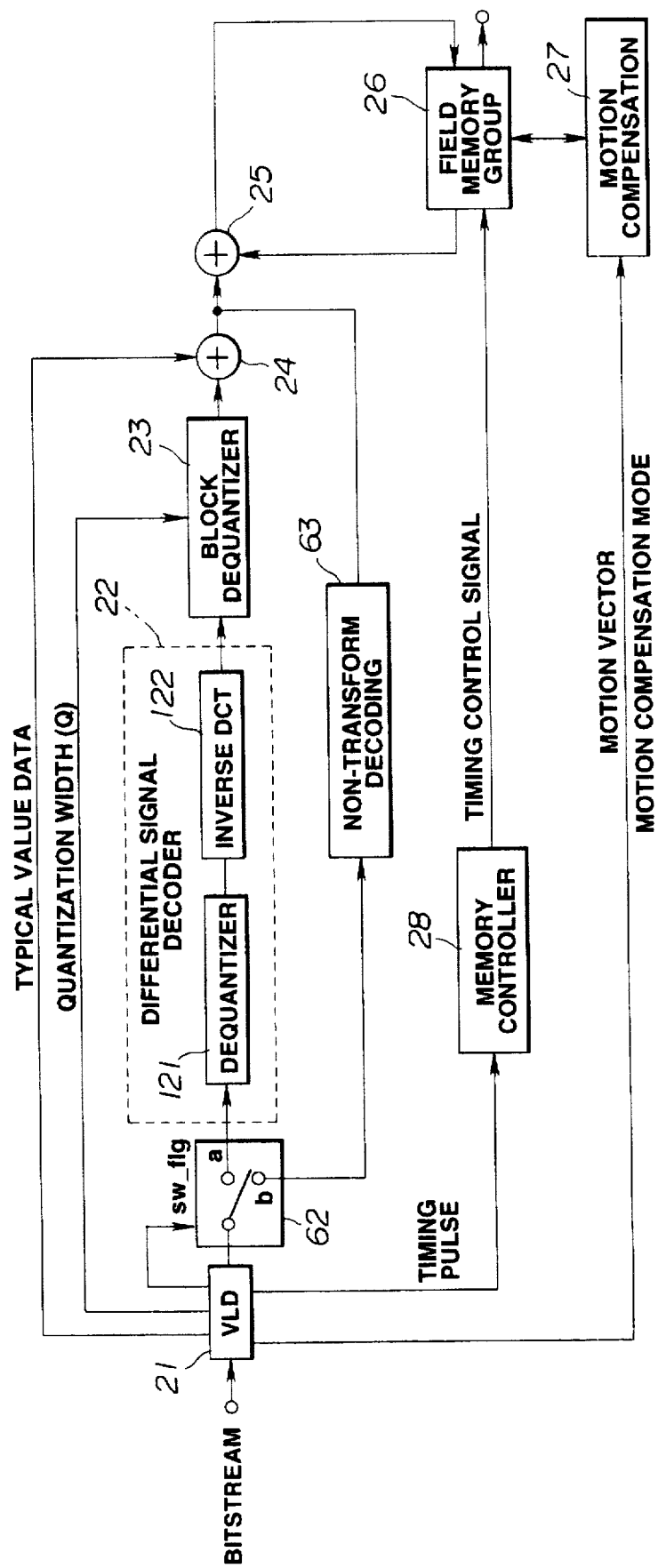
FIG. 18 is a schematic block diagram showing a structure of a picture signal decoding apparatus according to a third embodiment of the present invention.

FIG. 18 shows a picture signal decoding apparatus as a counterpart of the third embodiment of the present invention.

The present picture signal decoding apparatus is similar to the picture signal decoding apparatus of FIG. 6 except that the present picture signal decoding apparatus includes a changeover switches 62 and a non-transform decoding circuit 63.

In FIG. 18, the variable length decoder 21 decodes, when decoding the variable length codes, the flag SW_ FLG specifying the state of the changeover switch 62, and outputs the result of decoding to the changeover switch 62.

The changeover switch 62 is explained. The changeover switch 62 is switched by the flag SW_ FLG. That is, the changeover switch 62 of the decoder is set to the same state as that of the changeover switch 62 of the encoder. If the changeover switch 62 is connected to the terminal a, the picture signal decoding apparatus of FIG. 18 operates in the same way as the picture signal decoding apparatus shown in FIG. 6.

If the changeover switch 62 is connected to the terminal b, the variable length decoded signal is outputted to the non-transform decoding circuit 63. The non-transform decoding circuit 63 is similar to the non-transform decoding circuit 58 shown in FIG. 17. If the changeover switch 62 is perpetually connected to the terminal b, reversible encoding may be achieved.

The syntax of the bitstream in the third embodiment is now explained.

Referring to FIGS. 11 to 13 and 19, the format of the bitstream outputted by the picture signal encoding apparatus of the present invention is now explained. FIGS. 11 to 13 and 19 show the format comprised of the standard format, that is the format for the bitstream of MPEG-2 Video, and the underlined portions affixed thereto.

The syntax of the present third embodiment differs from that of the first embodiment as to a macro-block header shown in FIG. 19.

The format shown in FIG. 19 is a format for transmitting representative value data and the quantization width Q of a block constituting a macro-block (16×16 pixel block) from one macro-block to another. The present format corresponds to the standard macro-block to the header of the macro-block layer of which a portion indicated by L2 is added.

ntc_ identifier is a 1-bit flag for specifying whether or not non-transform encoding is to be performed. The DCT processing is performed or not performed depending upon whether this flag is 0 or 1, respectively.

If, in such case, the number of blocks making up each macro-block is m, m A-bit representative value data are set in the code block_base, so that, in the header of the macro-block layer, the code block_ base is defined as an A*m bit code.

Also, since m 3-bit quantization widths are set in the code block_ c_ scale, the code block_ q_ scale is defined as a 3*m bit code.

A fourth embodiment of the present invention is explained.

Figure 20:
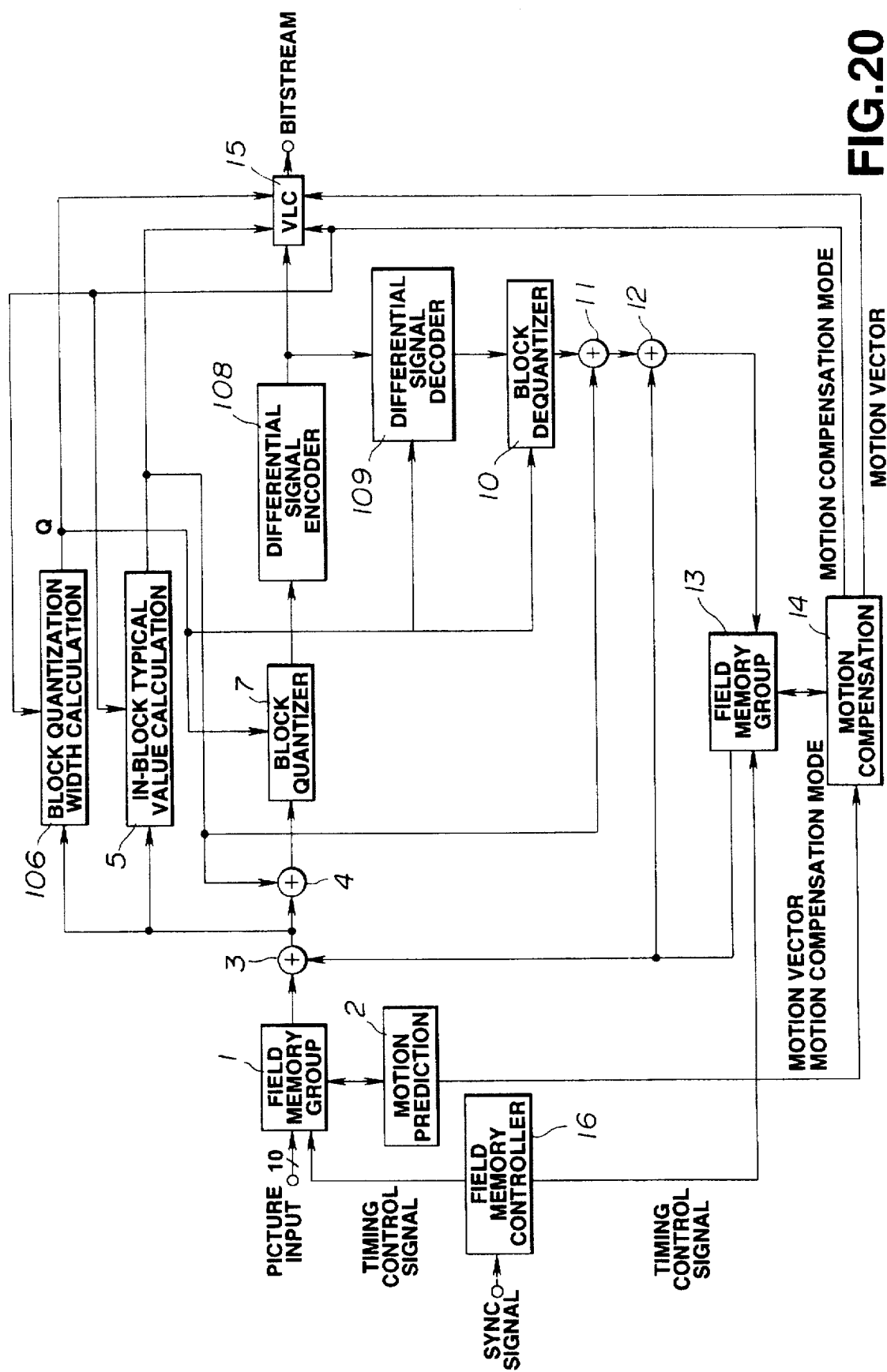
FIG. 20 is a schematic block diagram showing a structure of a picture signal encoding apparatus according to a fourth embodiment of the present invention.

FIG. 20 shows a typical picture signal encoding apparatus according to the fourth embodiment of the present invention.

The picture signal encoding apparatus of the present fourth embodiment is similar to the first embodiment of FIG. 3 except for a difference signal encoder 108, a difference signal encoder 109 and a block quantization width calculation circuit 106.

As in the first embodiment, the block quantization width calculation circuit 106 determines the quantization width Q for quantization by the block quantizer 7 and outputs the quantization width Q thus set to the block quantizer 7, difference signal decoder 109 and to the block dequantizer 10.

The block quantizer 7 and the block dequantizer 10 operate similarly to those of the first embodiment.

The difference signal encoder 108 is explained. The difference signal encoder 108 is made up of a DCT circuit and a quantizer, not shown, as in FIG. 1. The quantized data from the block quantizer 7 are transformed by DCT and quantized with a quantization width S corresponding to the stored quantity in a transmission buffer, not shown, provided downstream of the VLC circuit 15. The quantization width S is determined in the same way as in the first embodiment. The method for quantization after determination of the quantization width S differs from that used in the first embodiment.

If, in quantization in the block quantizer 7, the quantization width Q is other than 1, the quantization error is already produced in an amount proportionate to the quantization width Q. If now quantization is executed with the uniform quantization width Q for each block in the macro-block, the quantization error occurs in variable amounts from block to block. Also the quantization error due to quantization by the difference signal encoder 108 is added to the quantization error generated in the block quantizer 7.

Thus the quantization at the difference signal encoder 108 is executed using the quantization width S/Q, where Q is set on the block basis. In this manner, the degree of deterioration in the respective blocks in the macro-block is uniform, while a block deteriorated in the block quantizer 7 may be prohibited from being further deteriorated in the difference signal encoder 108.

The difference signal decoder 109 similarly performs dequantization using the quantization width S/Q.

Figure 21:
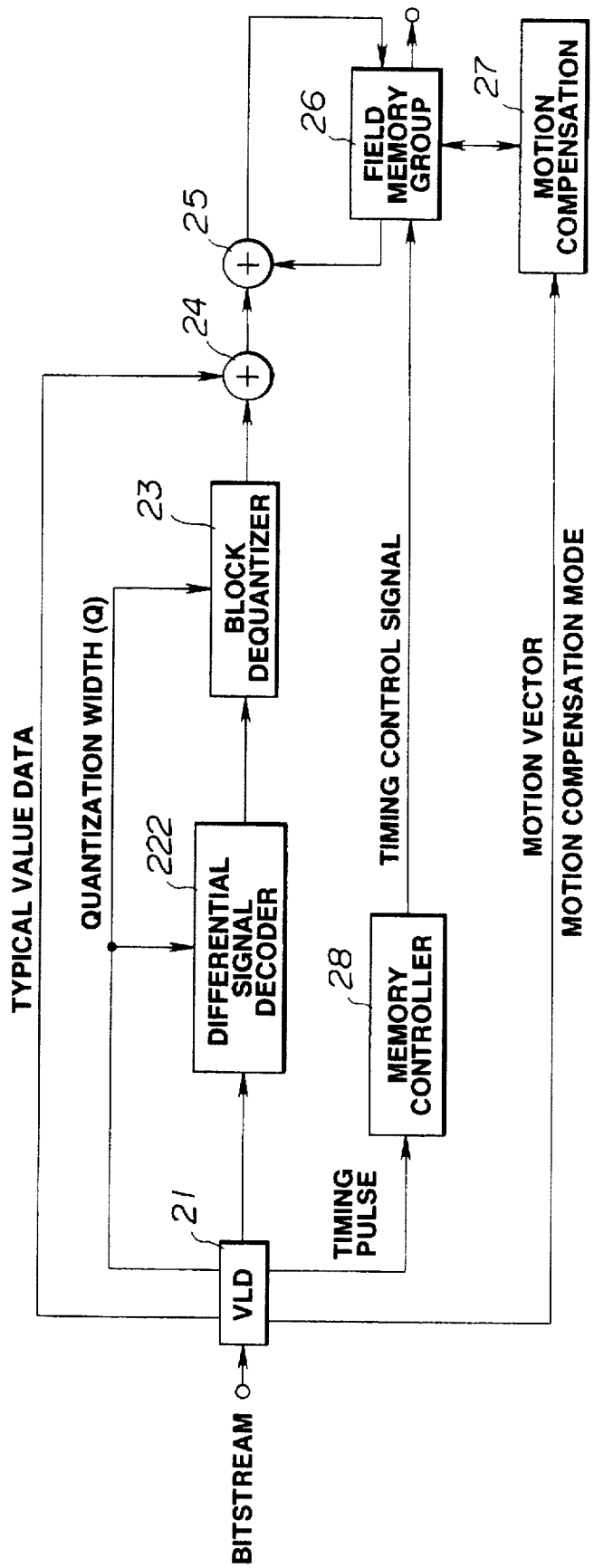
FIG. 21 is a schematic block diagram showing a structure of a picture signal decoding apparatus according to a fourth embodiment of the present invention.

FIG. 21 sows a picture signal decoding apparatus according to a fourth embodiment of the present invention.

The picture signal decoding apparatus of the fourth embodiment is similar to the picture signal decoding apparatus shown in FIG. 6 except for the difference signal decoder 222.

To the difference signal decoder 222 is supplied a quantization width Q, taken out by a VLD circuit 21, via the VLD circuit 21.

Although not shown, the difference signal decoder 222 is made up of a dequantization circuit and an inverse DCT circuit, as in FIG. 2. In the difference signal decoder 222, the quantized DCT data, that is 8-bit based picture data from the VLD circuit 21, converted from the 10-bit based picture data, is dequantized and inverse DCTed.

The present fourth embodiment differs from the second embodiment with respect to the dequantization method. The dequantization in the fourth embodiment occurs with the quantization width equal to S/Q, as in the above-described picture signal encoding apparatus.

The degree of deterioration in the respective blocks in the macro-block becomes uniform, while a block deteriorated in the block quantizer 7 may be prohibited from being further deteriorated in the difference signal encoder 8.

The syntax for the bitstream in the present fourth embodiment is similar to that in the first embodiment.

The present invention is not limited to the above-described embodiments. For example, although the above embodiments are designed for handling 10-bit based picture data using encoding or decoding circuits or devices inherently designed for handling customary 8-bit based picture data, the present invention can be easily applied for handling m-bit based picture data using encoding or decoding circuits or devices inherently designed for handling customary n-bit based picture data, where m and n are integers, with m>n. The encoded picture data produced by the embodiments of the present invention may be recorded on a picture signal recording medium, such as an optical disc, so as to be put on sale. The signal processing operations, such as first quantization or second quantization, may be executed using a variety of encoding and quantization techniques.

According to the present invention, representative value data and the quantization width are determined from block to block, and the difference between the picture data and the representative value data is calculated. The difference is quantized, based upon the quantization width, so that the quantization error is within one step at any quantization level for generating first quantization data. The first quantization data is transformed and the transform coefficients are quantized for generating second quantized data. The representative value data, quantization width and the second quantized data are encoded. Thus the bit-related definition of a picture may be converted in encoding and decoding the picture.

The quantization error may be reduced by putting the representative value at a mid point of the quantization width.

The encoder memory may be reduced in capacity by motion-compensating a m-bit based picture, such as a 10-bit based picture, using n bits, such as 8 bits.

In addition, high-definition pictures, such as m-bit based picture, e.g., 10-bit based picture, may be reversibly coded by adaptively switching between reversible coding and irreversible coding.

Furthermore, a picture of uniform picture quality may be obtained by executing second quantization based upon the quantization width for first quantization.

What is claimed is:

1. A picture signal encoding method for converting m-bit picture data into n-bit data, where m and n are integers, with m>n, comprising the steps of:

determining representative value data and quantization width of picture data for each pre-set block of m-bit input picture data;

calculating m-bit difference data between said picture data and said representative value data;

quantizing the m-bit difference data on the basis of said quantization width to n bits, where m and n are integers, with m>n, for generating first quantized data by a first quantization operation, using rounding which will produce an error not larger than one step between the quantization width in the neighborhood of 0 quantization level and that in other quantization levels;

transforming said first quantized data for generating transform coefficients;

quantizing said transform coefficients for generating second quantized data by a second quantization operation; and encoding said representative value data, said quantization width and the second quantized data.

2. The picture signal encoding method as claimed in claim 1 wherein said rounding is performed such that, if the quantization width Q is 3, the difference data x is quantized with the quantization width 3 in accordance with the following equations:

$$X = (x+1)/3 \text{ for } x \geq 0 \text{ and}$$

$$X = (x-1)/3 \text{ for } x < 0$$

for generating said first quantized data X.

3. The picture signal encoding method as claimed in claim 2 wherein said first quantization operation is performed so that, for an inter-picture prediction mode, the representative value will be put at the center of the quantization width.

4. The picture signal encoding method as claimed in claim 2 wherein said first quantization operation is performed so that, for an intra-picture prediction mode, the representative value will be put at the least value of the quantization width.

5. The picture signal encoding method as claimed in claim 1 wherein said rounding is performed such that, if the quantization width Q is 4, the difference data x is quantized with the quantization width 4 in accordance with the following equations:

$$X = (x+1)/4 \text{ for } x \geq 0 \text{ and}$$

$$X = (x-1)/4 \text{ for } x < 0$$

for generating said first quantized data X.

6. The picture signal encoding method as claimed in claim 5 wherein said first quantization operation is performed so that, for an inter-picture prediction mode, the representative value will be put at the center of the quantization width.

7. The picture signal encoding method as claimed in claim 5 wherein said first quantization operation is performed so that, for an intra-picture prediction mode, the representative value will be put at the least value of the quantization width.

8. The picture signal encoding method as claimed in claim 1 further comprising the steps of:

non-transform encoding the m-bit input picture data; and selecting one of an output of the step of generating said second quantized data and an output of the non-transform encoding step; the selected step output being supplied to said encoding step.

9. The picture signal encoding method as claimed in claim 8 wherein said non-transform encoding step is a run-length encoding step.

10. A picture signal recording medium having recorded thereon a signal produced by the steps of:

determining representative value data and quantization width of picture data for each pre-set block of m-bit input picture data;

calculating m-bit difference data between said picture data and said representative value data;

quantizing the m-bit difference data on the basis of said quantization width to n bits, where m and n are integers, with m>n, for generating first quantized data by a first quantization operation, using rounding which will produce an error not larger than one step between the quantization width in the neighborhood of 0 quantization level and that in other quantization levels;

transforming said first quantized data for generating transform coefficients;

quantizing said transform coefficients for generating second quantized data by a second quantization operation; and encoding said representative value data, said quantization width and the second quantized data.

* * * * *